US010019735B2

(12) United States Patent
Tajima et al.

(10) Patent No.: US 10,019,735 B2
(45) Date of Patent: Jul. 10, 2018

(54) ADVERTISEMENT DISTRIBUTION APPARATUS, DISTRIBUTION METHOD, AND DISTRIBUTION PROGRAM

(71) Applicant: YAHOO JAPAN CORPORATION, Tokyo (JP)

(72) Inventors: Akira Tajima, Tokyo (JP); Koji Tsukamoto, Tokyo (JP); Hidehito Gomi, Tokyo (JP); Hiroshi Nishikawa, Tokyo (JP); Taisuke Fujimoto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 720 days.

(21) Appl. No.: 13/926,487

(22) Filed: Jun. 25, 2013

(65) Prior Publication Data

US 2013/0346215 A1 Dec. 26, 2013

(30) Foreign Application Priority Data

Jun. 26, 2012 (JP) ................................. 2012-142863

(51) Int. Cl.
*G06Q 30/00* (2012.01)
*G06Q 30/02* (2012.01)

(52) U.S. Cl.
CPC ......... *G06Q 30/0269* (2013.01); *G06Q 30/02* (2013.01)

(58) Field of Classification Search
CPC .................................. G06Q 30/0207–30/0277
(Continued)

(56) References Cited

U.S. PATENT DOCUMENTS

| 7,188,137 B2 * | 3/2007 | Inoue ..................... G06Q 20/20 705/14.1 |
| 8,725,559 B1 * | 5/2014 | Kothari .............. G06Q 30/0251 705/14.1 |
| 2002/0143981 A1 * | 10/2002 | DeLima ................ H04L 41/147 709/233 |
| 2005/0071421 A1 * | 3/2005 | Calo .................. G06Q 30/0273 709/203 |

(Continued)

FOREIGN PATENT DOCUMENTS

| JP | A-2004-192284 | 7/2004 |
| JP | A-2004-347652 | 12/2004 |

(Continued)

OTHER PUBLICATIONS

Office Action issued in Japanese Application No. 2012-142863 dated Mar. 4, 2014 (with translation).

*Primary Examiner* — Matthew T Sittner
*Assistant Examiner* — Allan J Woodworth, II
(74) *Attorney, Agent, or Firm* — Oliff PLC

(57) ABSTRACT

An advertisement distribution apparatus according to an embodiment includes a user information table, a determining unit, a request unit, and a distribution unit. The user information table stores user information about a user. When the advertisement distribution apparatus is accessed by a user terminal, the determining unit determines whether the user information of the user of the user terminal has been stored in the user information table. When the determining unit determines that the user information has not been stored in the storage unit, the request unit requests an information provision apparatus to transmit the user information. When the determining unit determines that the user information has not been stored in the storage unit, the distribution unit distributes advertisement content to the user terminal using the user information which is acquired from the information provision apparatus by the request unit.

13 Claims, 13 Drawing Sheets

(58) Field of Classification Search
USPC .............................................. 705/14.1–14.73
See application file for complete search history.

(56) References Cited

U.S. PATENT DOCUMENTS

| | | | |
|---|---|---|---|
| 2005/0165643 A1* | 7/2005 | Wilson | G06Q 30/02 |
| | | | 705/14.53 |
| 2008/0275840 A1* | 11/2008 | Burger | G06F 17/30398 |
| 2009/0019227 A1* | 1/2009 | Koski | G06F 17/3048 |
| | | | 711/133 |
| 2010/0030647 A1* | 2/2010 | Shahshahani | G06Q 30/02 |
| | | | 705/14.66 |
| 2010/0106606 A1* | 4/2010 | Filice | G06Q 30/02 |
| | | | 705/14.73 |
| 2010/0293335 A1* | 11/2010 | Muthiah | G06F 12/0813 |
| | | | 711/133 |
| 2012/0047014 A1* | 2/2012 | Smadja | G06Q 30/02 |
| | | | 705/14.53 |
| 2012/0060062 A1* | 3/2012 | Lin | G06Q 10/00 |
| | | | 714/48 |
| 2012/0110467 A1* | 5/2012 | Blake | G06F 9/4451 |
| | | | 715/745 |

FOREIGN PATENT DOCUMENTS

| | | |
|---|---|---|
| JP | A-2008-016047 | 1/2008 |
| JP | A-2008-278262 | 11/2008 |
| JP | A-2009-145549 | 7/2009 |
| JP | A-2010-113542 | 5/2010 |
| JP | A-2013-084063 | 5/2013 |

\* cited by examiner

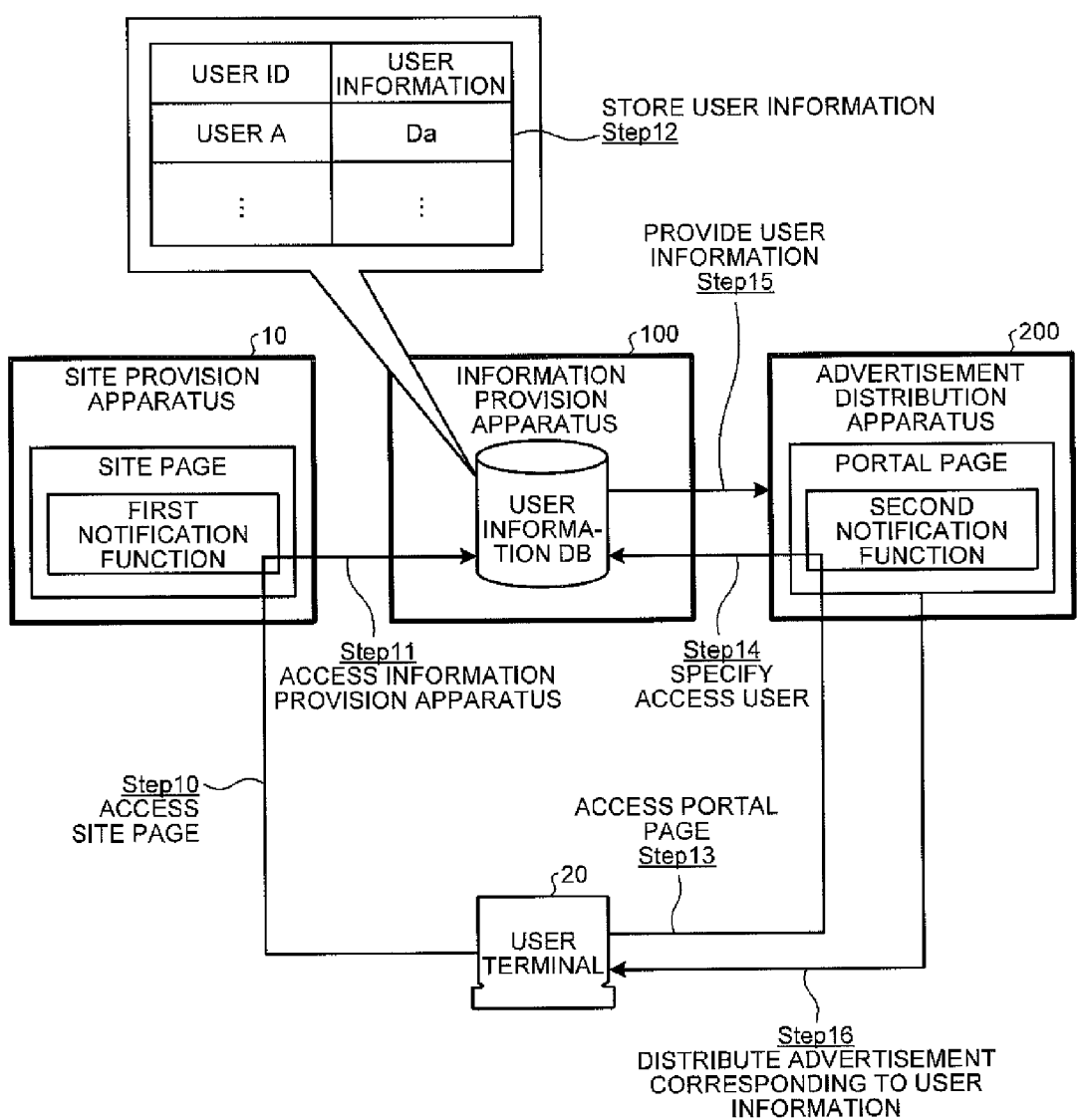

| USER ID | ACCESS DESTINATION INFORMATION | INFORMATION ABOUT NUMBER OF ACCESSES |
|---|---|---|
| $20_1$ | $10_1$ | 10 |
|  | $10_2$ | 1 |
|  | ... | ... |
| $20_2$ | $10_1$ | 0 |
|  | $10_2$ | 29 |
|  | ... | ... |
| ... | ... | ... |

| USER ID | PSYCHOGRAPHIC ATTRIBUTES | | | | | DEMOGRAPHIC ATTRIBUTES | | |
|---|---|---|---|---|---|---|---|---|
|  | COS-METICS | CAR | CLOTHES | TRAVEL | ... | SEX | AGE | ... |
| $20_1$ | 1 | 0 | 1 | 0 | ... | 1 | 28 | ... |
| $20_2$ | 1 | 0 | 1 | 0 | ... | 1 | 34 | ... |
| $20_3$ | 1 | 1 | 0 | 0 | ... | x | 22 | ... |
| $20_4$ | 0 | 0 | 0 | 0 | ... | 2 | x | ... |
| ... | ... | ... | ... | ... | ... | ... | ... | ... |

| USER ID | PSYCHOGRAPHIC ATTRIBUTES | | | | | DEMOGRAPHIC ATTRIBUTES | | | UPDATE DATE |
|---------|---------|-----|---------|--------|-----|-----|-----|-----|-----------|
| | COS-METICS | CAR | CLOTHES | TRAVEL | ... | SEX | AGE | ... | |
| U11 | 0 | 0 | 1 | 0 | ... | 1 | 28 | ... | 2012/3/30 |
| U12 | 1 | 1 | 0 | 1 | ... | x | 22 | ... | 2011/12/20 |
| ... | ... | ... | ... | ... | ... | ... | ... | ... | ... |

ADVERTISEMENT DISTRIBUTION APPARATUS, DISTRIBUTION METHOD, AND DISTRIBUTION PROGRAM

CROSS-REFERENCE TO RELATED APPLICATION

The present application claims priority to and incorporates by reference the entire contents of Japanese Patent Application No. 2012-142863 filed in Japan on Jun. 26, 2012.

BACKGROUND OF THE INVENTION

1. Field of the Invention

The present invention relates to an advertisement distribution apparatus, a distribution method, and a distribution program.

2. Description of the Related Art

In recent years, with the rapid spread of the Internet, the distribution of advertisements through the Internet has been actively performed. As an example of the distribution of advertisements, an icon indicating a company or a product is displayed at a predetermined position of a web page and the user clicks the icon to move the web page of the advertiser. This type of advertisement distribution is called a banner advertisement or an advertisement link. However, in the specification, this type of advertisement distribution is simply referred herein to as an "advertisement".

In the advertisement distribution, in order to improve the effect of advertisement, targeting distribution has been performed in which user information, such as the preference, sex, age, address, and job of the user, is registered in advance and advertisements corresponding to the user information are selectively distributed.

In some cases, the user information for the targeting distribution is provided from the information provider to the advertisement distributor. For example, the information provider can acquire the user information through a plurality of site providers and provide high-quality user information to the advertisement distributor, thereby earning a large amount of money for information provision from the advertisement distributor.

The advertisement distributor can acquire the user information from the information provider and perform targeting distribution using a large amount of user information. Therefore, it is possible to improve the advertisement effect. That is, the advertisement distributor pays the information provider for information provision, but can improve the advertisement effect. However, it is preferable that the advertisement distributor reduce the amount of money required for targeting distribution. A technique for effectively reducing the amount of money paid to the information provider has not been proposed.

SUMMARY OF THE INVENTION

According to one aspect of the embodiments, an advertisement distribution apparatus includes a storage unit that stores user information about a user, a determining unit that determines whether the user information of a user of a user terminal has been stored in the storage unit when the advertisement distribution apparatus is accessed by the user terminal, a request unit that requests an information provision apparatus which stores predetermined user information to transmit the user information of the user terminal when the determining unit determines that the user information has not been stored in the storage unit, and a distribution unit that distributes advertisement content to the user terminal, using the user information which is acquired from the information provision apparatus by the request unit, when the determining unit determines that the user information has not been stored in the storage unit, and distributes the advertisement content using the user information stored in the storage unit when the determining unit determines that the user information has been stored in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a diagram illustrating an example of an information provision method according to a first embodiment;

FIG. 4 is a diagram illustrating an example of an access history table according to the first embodiment;

FIG. 5 is a diagram illustrating an example of a user attribute table according to the first embodiment;

DETAILED DESCRIPTION OF THE PREFERRED EMBODIMENTS

Figure 1B:
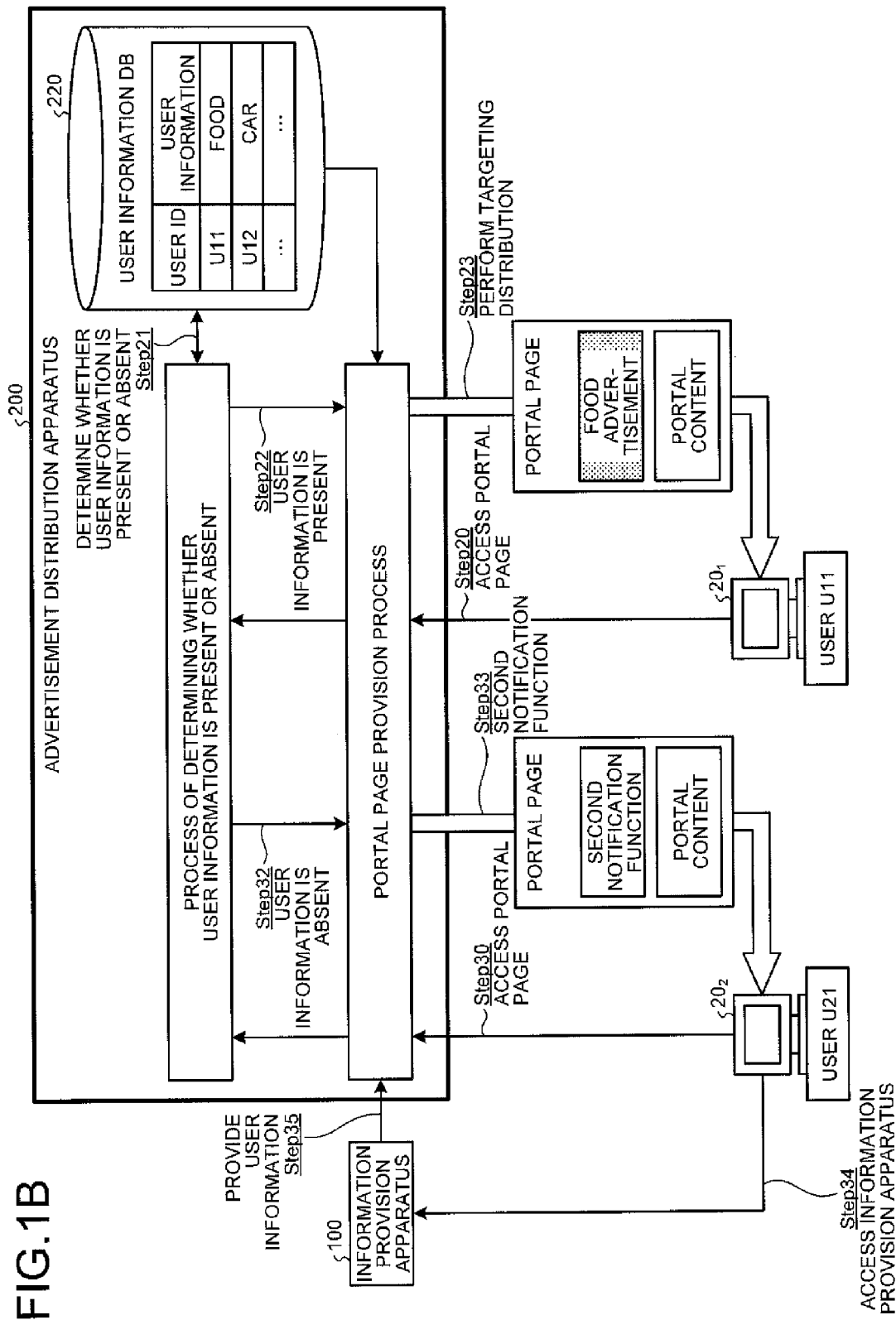
FIG. 1B is a diagram illustrating an example of the information provision method according to the first embodiment.

Hereinafter, an advertisement distribution apparatus, a distribution method, and a distribution program according to exemplary embodiments (hereinafter, referred to as "embodiments") of the invention will be described in detail with reference to the accompanying drawings. The advertisement distribution apparatus, the distribution method, and the distribution program according to the invention are not limited by the embodiments. The embodiments can be combined with each other within the range in which the content of processes is not inconsistent. In addition, in the following embodiments, an IP (Internet Protocol) network is given as an example of a communication network connected to an information provision apparatus. However, the communication network is not limited to the IP network. In the following embodiments, a banner advertisement is given as an example of the content of an advertisement transmitted from the advertisement distribution apparatus. However, the content of the advertisement is not limited to the banner advertisement.

1. First Embodiment

1-1. Information Provision Method

First, an example of an information provision method according to a first embodiment will be described with reference to FIGS. 1A and 1B. The information provision method illustrated in FIGS. 1A and 1B includes a process of collecting user information using an information provision apparatus 100 and a process of providing the user information from the information provision apparatus 100 to an advertisement distribution apparatus 200. Furthermore, the information provision method includes a determination process of determining whether the advertisement distribution apparatus 200 acquires the user information from the information provision apparatus 100, in addition to the above-mentioned processes. Next, these processes will be sequentially described.

First, the process of collecting the user information using the information provision apparatus 100 and the process of providing the user information from the information provision apparatus 100 to the advertisement distribution apparatus 200 will be described with reference to FIG. 1A. A site provision apparatus 10 and the advertisement distribution apparatus 200 illustrated in FIG. 1A each provide web pages. Hereinafter, in order to distinguish the web pages, in some cases, the web page provided by the site provision apparatus 10 is referred to as a "site page" and the web page provided by the advertisement distribution apparatus 200 is referred to as a "portal page". In this embodiment, for convenience of explanation, the web page provided by the advertisement distribution apparatus 200 is referred to as the "portal page". However, in some cases, the advertisement distribution apparatus 200 provides web pages other than the portal site.

As illustrated in FIG. 1A, a user terminal 20 accesses the site provision apparatus 10 in order to acquire the site page provided by the site provision apparatus 10 (Step S10). The site page provided by the site provision apparatus 10 includes a notification function (hereinafter, referred to as a first notification function) of notifying the information provision apparatus 100 of user identification information for identifying the user terminal 20 which accesses the site page. The first notification function is implemented by, for example, a web beacon.

The user terminal 20 accesses the information provision apparatus 100 on the basis of the first notification function inserted into the site page of the site provision apparatus 10 (Step S11). When the user terminal 20 accesses the information provision apparatus 100 on the basis of the first notification function, the information provision apparatus 100 specifies the site provision apparatus 10, which is the access destination of the user terminal 20, and stores information about the specified access destination in a user information DB (Database) so as to be associated with user information Da and the user identification information (user ID) (Step S12).

Alternatively, the information provision apparatus 100 determines psychographic attributes or demographic attributes on the basis of the information about the access destination and stores the determined attribute information as the user information Da in the user information DB, in addition to the information about the access destination of the user terminal 20. In addition, the information provision apparatus 100 acquires the demographic attributes related to the user of the user terminal 20 from the site provision apparatus 10 accessed by the user terminal 20 and stores the acquired demographic attributes in the user information DB.

As such, the information provision apparatus 100 stores the user information in the user information DB so as to be associated with the user identification information. The user can be identified by, for example, inserting the user identification information into an HTTP cookie (Hypertext Transfer Protocol Cookie: hereinafter, simply referred to as a "cookie") exchanged between the user terminal 20 and the information provision apparatus 100. In addition, a dedicated program may be set in the user terminal 20 and the user identification information may be transmitted by the dedicated program.

Next, the process of providing the user information from the information provision apparatus 100 to the advertisement distribution apparatus 200 will be described. As illustrated in FIG. 1A, the user terminal 20 accesses the advertisement distribution apparatus 200 in order to acquire the portal page provided by the advertisement distribution apparatus 200 (Step S13). The portal page of the advertisement distribution apparatus 200 includes a notification function (hereinafter, referred to as a second notification function) of notifying the information provision apparatus 100 of the user identification information for identifying the user terminal 20 which accesses the portal page. Similarly to the first notification function, the second notification function is implemented by, for example, the web beacon.

The user terminal 20 accesses the information provision apparatus 100 on the basis of the second notification function inserted into the portal page. When the user terminal 20 accesses the information provision apparatus 100 on the basis of the second notification function, the information provision apparatus 100 identifies the user of the user terminal 20 (Step S14), reads the user information Da corresponding to the identified user from the user information DB, and provides the user information Da to the advertisement distribution apparatus 200 (Step S15). The user may be identified by, for example, the above-mentioned cookie.

When acquiring the user information Da from the information provision apparatus 100, the advertisement distribution apparatus 200 selects advertisement content corresponding to the user information Da and transmits the selected advertisement content to the user terminal 20 (Step S16). In this way, the advertisement distribution apparatus 200 can perform a targeting distribution process of selectively distributing advertisement content corresponding to the user information.

The advertisement distributor who manages the advertisement distribution apparatus 200 pays the information provider who manages the information provision apparatus 100 for the provision of the user information. In the following embodiments, it is assumed that the measured rate system is used for the payment. That is, the advertisement distributor pays a larger amount of money to the information provider as a larger amount of user information is acquired from the information provision apparatus 100.

As illustrated in FIG. 1A, when the advertisement distribution apparatus 200 acquires the user information from the information provision apparatus 100 each time it is accessed by the user terminal 20 accesses the advertisement distribution apparatus 200, the amount of money paid to the information provision apparatus 100 increases in proportion to the number of accesses and expense required for targeting distribution increases. In addition, when the advertisement distribution apparatus 200 acquires the user information from the information provision apparatus 100 each time the user terminal 20 accesses the advertisement distribution apparatus 200, it notifies the information provider, which is another service provider, of information indicating that the user terminal 20 has accessed the portal page. This causes the problem that the access information about the portal page leaks to the information provider. In this situation, it is preferable that the advertisement distribution apparatus 200 do not acquire the user information more than necessary from the information provision apparatus 100.

Therefore, in the information provision method according to the first embodiment, the advertisement distribution apparatus 200 stores the user information and it is determined whether the host apparatus (advertisement distribution apparatus 200) stores the user information of the user terminal 20 when the user terminal 20 accesses the advertisement distribution apparatus 200. When the user information has not been stored, the advertisement distribution apparatus 200 acquires the user information from the information provision apparatus 100 and then performs the targeting distribution. However, when the user information has been stored, the advertisement distribution apparatus 200 performs the targeting distribution, without acquiring the user information from the information provision apparatus 100. Next, the process of determining whether the user information is acquired will be described with reference to FIG. 1B.

As illustrated in FIG. 1B, the advertisement distribution apparatus 200 according to the first embodiment stores a user information DB 220. The user information DB 220 stores the user information of the user terminal 20 which has accessed the portal page or the user information which has been previously provided from the information provision apparatus 100. For example, when the user terminal 20 accesses the portal page, the advertisement distribution apparatus 200 estimates the favorite field of the user who has accessed the portal page, on the basis of the attributes of the portal page, and stores the estimation result as the user information in the user information DB 220. In the example illustrated in FIG. 1B, the user information DB 220 stores user information indicating that the user identified by a user ID "U11" is interested in "food" or user information indicating that the user identified by a user ID "U12" is interested in "car".

In the example illustrated in FIG. 1B, user terminals $20_1$ and $20_2$ access the portal pages provided by the advertisement distribution apparatus 200. It is assumed that the user terminal $20_1$ is used by a user U11 with the user ID "U11" and the user terminal $20_2$ is used by a user U21 with the user ID "U21".

In this structure, when the user terminal $20_1$ accesses the portal page (Step S20), the advertisement distribution apparatus 200 determines whether the user information of the user terminal $20_1$ is present or absent in the user information DB 220 (Step S21). In the example illustrated in FIG. 1B, since the user ID "U11" is stored in the user information DB 220, the advertisement distribution apparatus 200 determines that the user information is "present" (Step S22). In this case, the advertisement distribution apparatus 200 distributes a portal page including the advertisement content in the favorite field of the user U11 to the user terminal $20_1$, on the basis of the user information stored in the user information DB 220 (Step S23).

In the example illustrated in FIG. 1B, user information "food" is stored in the user information DB 220 so as to be associated with the user ID "U11". Therefore, the advertisement distribution apparatus 200 distributes, for example, a portal page including advertisement content related to "food". As illustrated in FIG. 1B, the portal page includes portal contents, which are various kinds of original contents to be indicated by the portal page, in addition to the advertisement content.

Then, when the advertisement distribution apparatus 200 is accessed by the user terminal $20_2$ (Step S30), similarly to the above-mentioned example, it determines whether the user information of the user terminal $20_2$ is present or absent in the user information DB 220 (Step S21). In the example illustrated in FIG. 1B, since the user ID "U21" is not stored in the user information DB 220, the advertisement distribution apparatus 200 determines that the user information is "absent" (Step S32). In this case, the advertisement distribution apparatus 200 request the information provision apparatus 100 to transmit the user information of the user terminal $20_2$. Specifically, the advertisement distribution apparatus 200 distributes the portal page including the second notification function to the user terminal $20_2$ (Step S33). At that time, the user terminal $20_2$ displays portal content in which advertisement content is not displayed in an advertisement frame on, for example, a browser.

Similarly to the example illustrated in FIG. 1A, the user terminal $20_2$ accesses the information provision apparatus 100 on the basis of the second notification function inserted into the portal page (Step S34). The information provision apparatus 100 provides the user information corresponding to the user of the user terminal 20 to the advertisement distribution apparatus 200 (Step S35). Then, the advertisement distribution apparatus 200 selects advertisement content corresponding to the user information acquired from the information provision apparatus 100 and distributes the advertisement content to the user terminal $20_2$. Therefore, the advertisement content corresponding to the user U21 is displayed in the advertisement frame of the portal content distributed in Step S33.

As such, in the information provision method according to the first embodiment, the advertisement distribution apparatus 200 determined whether the user information has been stored. Therefore, the advertisement distribution apparatus 200 does not acquire the user information more than necessary from the information provision apparatus 100. As a result, in the information provision method according to the first embodiment, it is possible to reduce the amount of user information acquired from the information provision apparatus 100. In the case of the measured rate system, it is possible to reduce the amount of money paid to the information provision apparatus 100.

In addition, the information provision method according to the first embodiment is effective in systems other than the measured rate system. Specifically, in the information provision method according to the first embodiment, since the advertisement distribution apparatus 200 does not acquire the user information more than necessary from the information provision apparatus 100, information indicating that the user terminal 20 has accessed the portal page is not positively notified to the information provider. In the information provision method according to the first embodiment, since the advertisement distribution apparatus 200 does not constantly acquire the user information from the information provision apparatus 100, it is possible to reduce the amount of communication between the information provision apparatus 100 and the advertisement distribution apparatus 200. As a result, it is possible to reduce the load of the communication network.

In this embodiment, the access information of the user to the site page of the site provision apparatus 10 or information based on the access information is used as the user information. However, the user information is not limited thereto. That is, access information to the provision apparatus which provides content to the user or information based on the access information may be used as the user information.

Next, the information provision apparatus 100 and the advertisement distribution apparatus 200 performing the information provision method according to the first embodiment will be described in detail with reference to FIGS. 2 to 10. In the example illustrated in FIG. 1B, the advertisement distribution apparatus 200 does not acquire the user information from the information provision apparatus 100 when the user information has been stored in the user information DB 220. However, an example in which the advertisement distribution apparatus 200 determines whether the user information is acquired on the basis of other conditions in addition to the above-mentioned condition will be described.

1-2. Structure of Advertisement Distribution System

Figure 2:
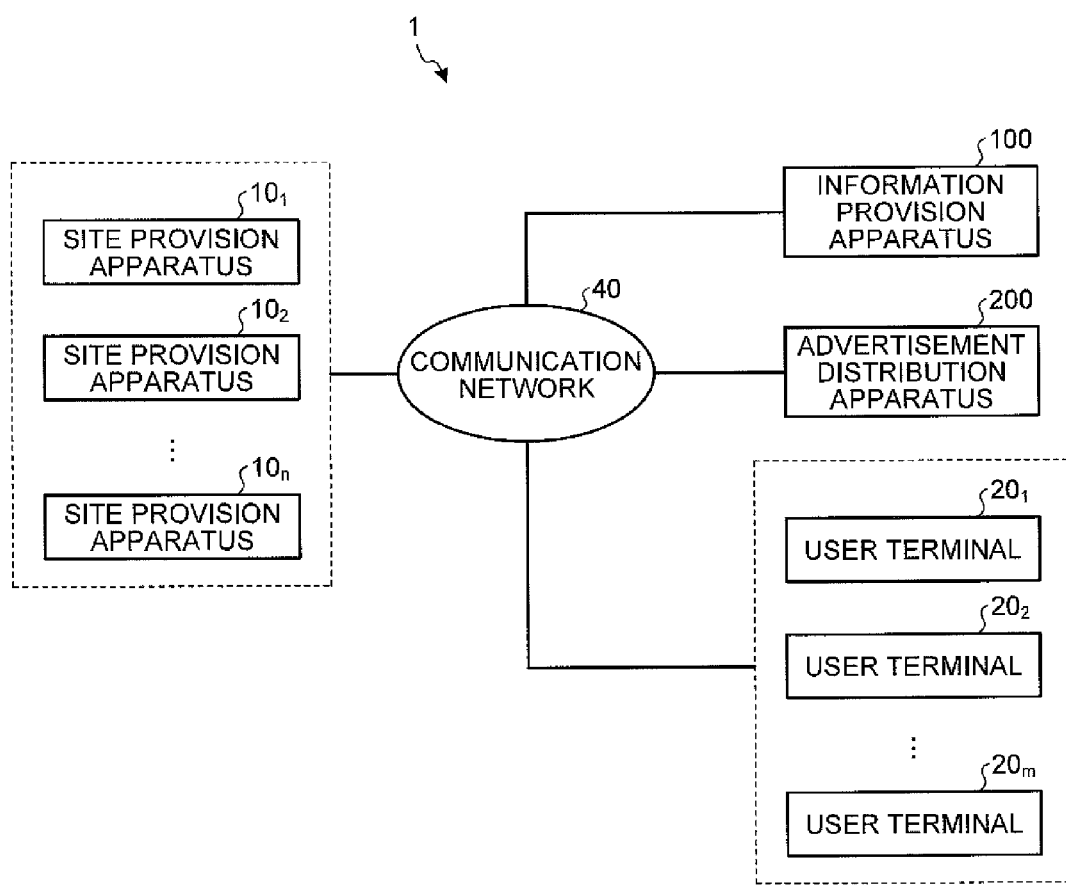
FIG. 2 is a diagram illustrating an example of the structure of an advertisement distribution system according to the first embodiment.

Next, the structure of an advertisement distribution system including the advertisement distribution apparatus according to the first embodiment will be described with reference to FIG. 2. As illustrated in FIG. 2, an advertisement distribution system 1 according to the first embodiment includes site provision apparatuses $10_1$ to $10_n$, user terminals $20_1$ to $20_m$, the information provision apparatus 100, and the advertisement distribution apparatus 200. These apparatuses are connected such that they can communicate with each other through a communication network 40. The site provision apparatuses $10_1$ to $10_n$ are managed by the site operator, the information provision apparatus 100 is managed by the information provider, and the advertisement distribution apparatus 200 is managed by the advertisement distributor. FIG. 2 illustrates one information provision apparatus 100 and one advertisement distribution apparatus 200. However, in some cases, the advertisement distribution system 1 includes a plurality of information provision apparatuses 100 or a plurality of advertisement distribution apparatuses 200.

In some cases, when the site provision apparatuses $10_1$ to $10_n$ do not need to be distinguished from each other, they are generically referred to as "site provision apparatuses 10". In addition, in some cases, when the user terminals $20_1$ to $20_m$ do not need to be distinguished from each other, they are generically referred to as "user terminals 20".

The site provision apparatus 10 is a server apparatus which provides various site pages when it is accessed by the user terminal 20. As described above, the site page provided by the site provision apparatus 10 includes the first notification function implemented by, for example, a web beacon. For example, the web beacon has a function of allowing the user terminal 20 which has accessed the site page to access a transparent image or a very small image (also referred to as a "clear GIF") stored in the information provision apparatus 100. Therefore, the information provision apparatus 100 can acquire information from the user terminal 20. The information which is acquired from the user terminal 20 by the information provision apparatus 100 using the web beacon, which is a notification program, includes, for example, identification information of the site provision apparatus 10 or access unique information which is unique to each access to the site page. In addition, the identification information of the information provision apparatus 100 or the access unique information is set to, for example, an HTTP request query transmitted from the user terminal 20 to the information provision apparatus 100 by the first notification function.

The user terminal 20 is, for example, a PC (Personal Computer) or a PDA (Personal Digital Assistant) used by the user. The user terminal 20 is operated by the user to access the site page provided by the site provision apparatus 10 or the portal page provided by the advertisement distribution apparatus 200.

The advertisement distribution apparatus 200 is an information processing apparatus which provides a portal page (for example, a web page of a portal site) including advertisement content, such as a banner advertisement, when it is accessed by the user terminal 20. As described above, the portal page provided by the advertisement distribution apparatus 200 includes the second notification function which is implemented by, for example, the web beacon. The web beacon has a function of allowing the user terminal 20 which has accessed the portal page to access a transparent image or a very small image stored in the information provision apparatus 100. In this way, the information provision apparatus 100 acquires information from the user terminal 20. The information which is acquired from the user terminal 20 by the information provision apparatus 100 using the second notification function includes, for example, the identification information of the advertisement distribution apparatus 200 or access unique information which is unique to each accesses to the portal page. The identification information of the advertisement distribution apparatus 200 or the access unique information is set to, for example, the HTTP request query transmitted from the user terminal 20 to the information provision apparatus 100 by the second notification function.

The information provision apparatus 100 is an information processing apparatus which collects the state of the access of the user terminal 20 to the site provision apparatus 10 and provides the user information to the advertisement distribution apparatus 200 on the basis of the collection result. The information provision apparatus 100 collects the user information through a plurality of site provision apparatuses 10 in cooperation with the site operators, integrates or processes the collected user information, and provides the user information to the advertisement distribution apparatus 200. The information provider who manages the information provision apparatus 100 receives payment for the provision of the user information from the advertisement distributor and pays the site operator for cooperation in acquiring the user information.

When the user terminal 20 accesses the site pages provided by the plurality of site provision apparatuses 10, the information provision apparatus 100 according to the first embodiment receives the access by the user terminal 20 using the first notification function. In this case, the information provision apparatus 100 transmits and receives the user identification information to and from each user terminal 20 to identify the user terminal 20. For example, the information provision apparatus 100 transmits a cookie as the user identification information to the user terminal 20. In this way, the information provision apparatus 100 identifies the user terminal 20 which accesses the site page. Therefore, the information provision apparatus 100 can acquire the user information (for example, the access history of the site page) of the user terminal 20. Then, the information provision apparatus 100 provides various kinds of user information to the advertisement distribution apparatus 200 such that the advertisement distribution apparatus 200 can perform targeting distribution.

1-3. Structure of Information Provision Apparatus 100

Figure 3:
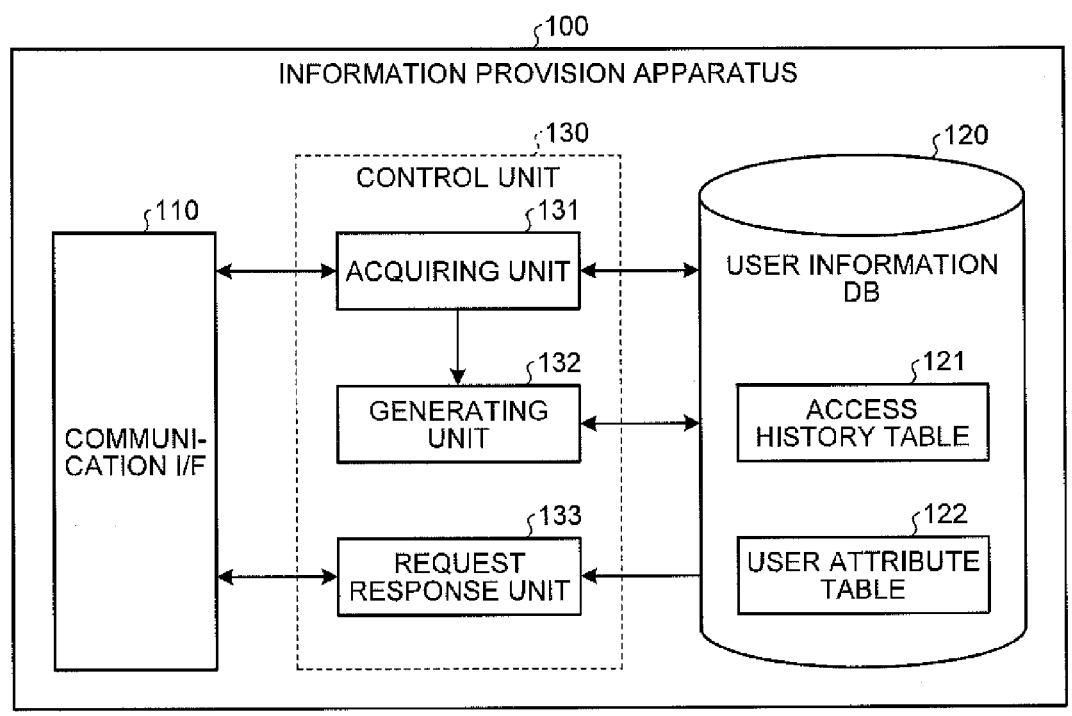
FIG. 3 is a diagram illustrating an example of the structure of an information provision apparatus according to the first embodiment.

Next, the structure of the information provision apparatus 100 according to the first embodiment will be described with reference to FIG. 3. As illustrated in FIG. 3, the information provision apparatus 100 according to the first embodiment includes a communication I/F (interface) 110, a user information DB 120, and a control unit 130.

The communication I/F 110 is, for example, an NIC (Network Interface Card). The control unit 130 transmits and receives various kinds of data to and from the site provision apparatus 10, the user terminal 20, and the advertisement distribution apparatus 200 connected to the communication network 40 through the communication I/F 110.

The user information DB 120 includes an access history table 121 and a user attribute table 122. The user information DB 120 is, for example, a semiconductor memory device, such as a RAM (Random Access Memory) or a flash memory, or a storage device, such as a hard disk or an optical disk.

The control unit 130 includes an acquiring unit 131, a generating unit 132, and a request response unit 133. The control unit 130 is implemented by, for example, an integrated circuit, such as an ASIC (Application Specific Integrated Circuit) or an FPGA (Field Programmable Gate Array). For example, a CPU (Central Processing Unit) or an MPU (Micro Processing Unit) executes a program stored in a storage device (not illustrated) using a RAM as a work area to implement the functions of the control unit 130. The control unit 130 implements or executes the following information processing function or operation.

1-3(1). Access History Table 121

Next, an example of the access history table 121 will be described with reference to FIG. 4. The access history table 121 stores information about the history of the access of each user terminal 20 to each site provision apparatus 10. In the example illustrated in FIG. 4, the access history table 121 stores information in which "access destination information" and "information about the number of accesses" are associated with each other for each "user ID".

The "user ID" is user identification information for identifying the user terminal 20. The "user ID" is information which is allocated to each user terminal 20 by the information provision apparatus 100. For example, the "user ID" is inserted into the cookie which is transmitted and received between the information provision apparatus 100 and the user terminal 20. When the user terminal 20 is provided with a plurality of browsers, a plurality of "user IDs" are allocated to one user terminal 20. However, in this embodiment, for simplicity of explanation, it is assumed that the user terminal 20 is provided with one browser.

The "access destination information" is information indicating the site provision apparatus 10 accessed by the user terminal 20. The "number of accesses information" is information indicating the number of times the user terminal 20 accesses the site provision apparatus 10.

In the example illustrated in FIG. 4, the "user IDs" in the access history table 121 correspond to the reference numerals attached to the user terminals 20, to $20_m$ illustrated in FIG. 2. The "access destination information" in the access history table 121 corresponds to reference numerals attached to the site provision apparatuses $10_1$ to $10_n$ illustrated in FIG. 2.

That is, the example illustrated in FIG. 4 shows that the user terminal $20_1$ accesses the site provision apparatus $10_1$ ten times and accesses the site provision apparatus $10_2$ once and the user terminal $20_2$ does not access the site provision apparatus $10_1$ and accesses the site provision apparatus $10_2$ twenty-nine times. As such, the access history table 121 illustrated in FIG. 4 stores the access history indicating the site pages accessed by each user terminal 20 as the user information.

1-3(2). User Attribute Table 122

Next, an example of the user attribute table 122 will be described with reference to FIG. 5. The user attribute table 122 stores the user information in which the user ID and the user attribute information are associated with each other. In the example illustrated in FIG. 5, the user attribute table 122 stores the "psychographic attributes" and the "demographic attributes" for each "user ID".

The "psychographic attributes" are information indicating, for example, the values, lifestyle, character, and preference of the user. The "psychographic attributes" are classified into, for example, attributes "cosmetics", "car", "clothes", and "travel". In the example illustrated in FIG. 5, "1" is set to each attribute with a relatively high user preference and "0" is set to each attribute with a relatively low user preference. However, the invention is not limited thereto, but the user preference may be divided into three or more levels for each attribute and information about the user preference may be stored for each attribute. In addition, the "psychographic attributes" are not limited to the attributes illustrated in FIG. 5, but may include various attributes such as a bicycle and economy.

The "demographic attributes" indicate demographic user attribute information. The "demographic attributes" are classified into, for example, attributes "sex" and "age" of the user. For the attribute "sex" illustrated in FIG. 5, "1" is stored when the user is a female and "2" is stored when the user is a male. When the sex of the user is unclear, "x" is stored. For the attribute "age", the age of the user is stored. When the age of the user is unclear, "x" is stored. The "demographic attributes" are not limited to the attributes illustrated in FIG. 5, but may include various attributes, such as the job, family structure, annual income, address, and academic background of the user.

For example, the generating unit 132, which will be described below, integrates and estimates the user information stored in the access history table 121 to generate various kinds of attribute information, which are the user information stored in the user attribute table 122.

1-4. Structure of Advertisement Distribution Apparatus 200

Figure 6:
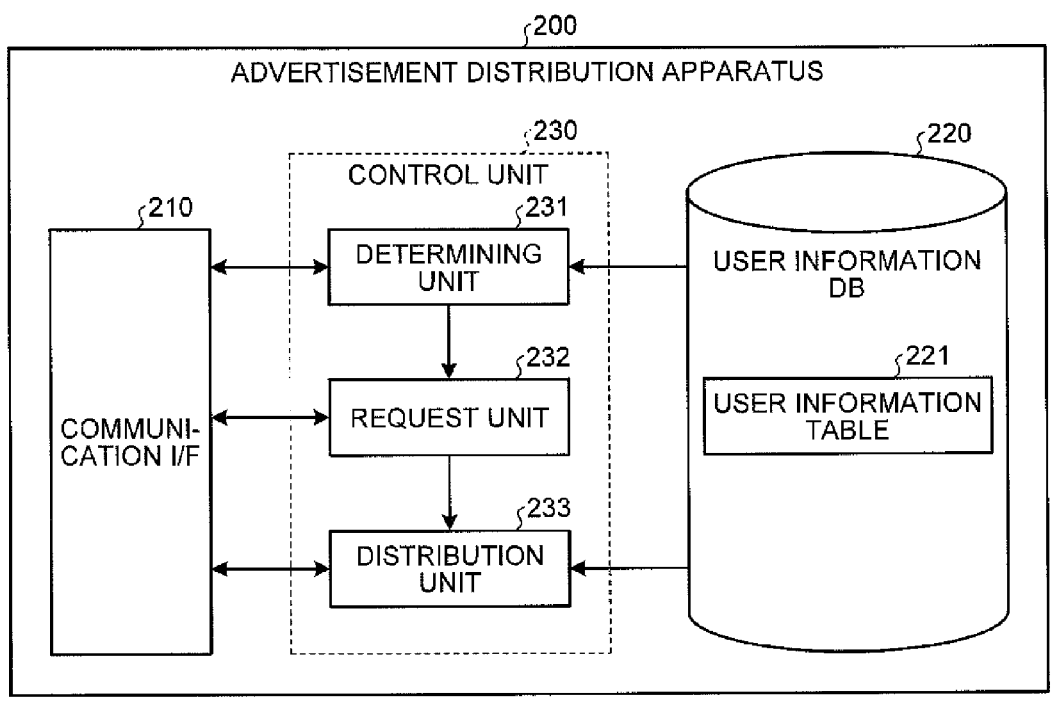
FIG. 6 is a diagram illustrating an example of the structure of an advertisement distribution apparatus according to the first embodiment.

Next, the structure of the advertisement distribution apparatus 200 according to the first embodiment will be described with reference to FIG. 6. As illustrated in FIG. 6, the advertisement distribution apparatus 200 according to the first embodiment includes a communication I/F 210, a user information DB 220, and a control unit 230.

The communication I/F 210 is, for example, an NIC. The control unit 230 transmits and receives various kinds of data to and from the site provision apparatus 10, the user terminal 20, and the information provision apparatus 100 connected to the communication network 40 through the communication I/F 210.

The user information DB 220 includes a user information table 221. The user information DB 220 is, for example, a semiconductor memory device, such as a RAM or a flash memory, or a storage device, such as a hard disk or an optical disk.

The control unit 230 includes a determining unit 231, a request unit 232, and a distribution unit 233. The control unit 230 is implemented by, for example, an integrated circuit, such as an ASIC or an FPGA. For example, a CPU or an MPU executes a program stored in a storage device (not illustrated) using a RAM as a work area to implement the function of the control unit 230. The control unit 230 implements or executes the following information processing function or operation.

1-5. User Information Table 221

Next, an example of the user information table 221 will be described with reference to FIG. 7. The user information table 221 stores the user information of the user terminal 20. For example, the user information table 221 stores user information about the user who accesses the portal page or information about the user who is registered as a member in the advertisement distribution apparatus 200. In addition, for example, the user information table 221 may store the user information supplied from the information provision apparatus 100.

Figure 7:
FIG. 7 is a diagram illustrating an example of a user information table according to the first embodiment.

In the example illustrated in FIG. 7, the user information table 221 stores "psychographic attributes", "demographic attributes", and an "update date" for each "user ID". The "psychographic attributes" and the "demographic attributes" are the same as those in the example illustrated in FIG. 5. The "update date" indicates the date and time (in the example illustrated in FIG. 7, year, month, and day) when the "psychographic attributes" and the "demographic attributes" are updated.

For example, in FIG. 7, the user information (the psychographic attributes and the demographic attributes) corresponding to the user ID "U11" was updated on Mar. 30, 2012 and the user information (the psychographic attributes and the demographic attributes) corresponding to the user ID "U12" was updated on Dec. 20, 2011.

In the first embodiment, it is assumed that the information provision apparatus 100 and the advertisement distribution apparatus 200 independently allocate user IDs to each user and allocate different user IDs to the same user for management. It is assumed that the user ID "U11" illustrated in FIG. 7 corresponds to the user ID of the user terminal $20_1$ illustrated in FIG. 2 and the user ID "U12" corresponds to the user ID of a user terminal $20_3$ illustrated in FIG. 2.

1-6. Operation (Attribute Information Update Process)

Next, the procedure of an attribute information update process of the information provision apparatus 100 according to the first embodiment will be described with reference to FIG. 8. The attribute information update process is repeatedly performed by the control unit 130.

Figure 8:
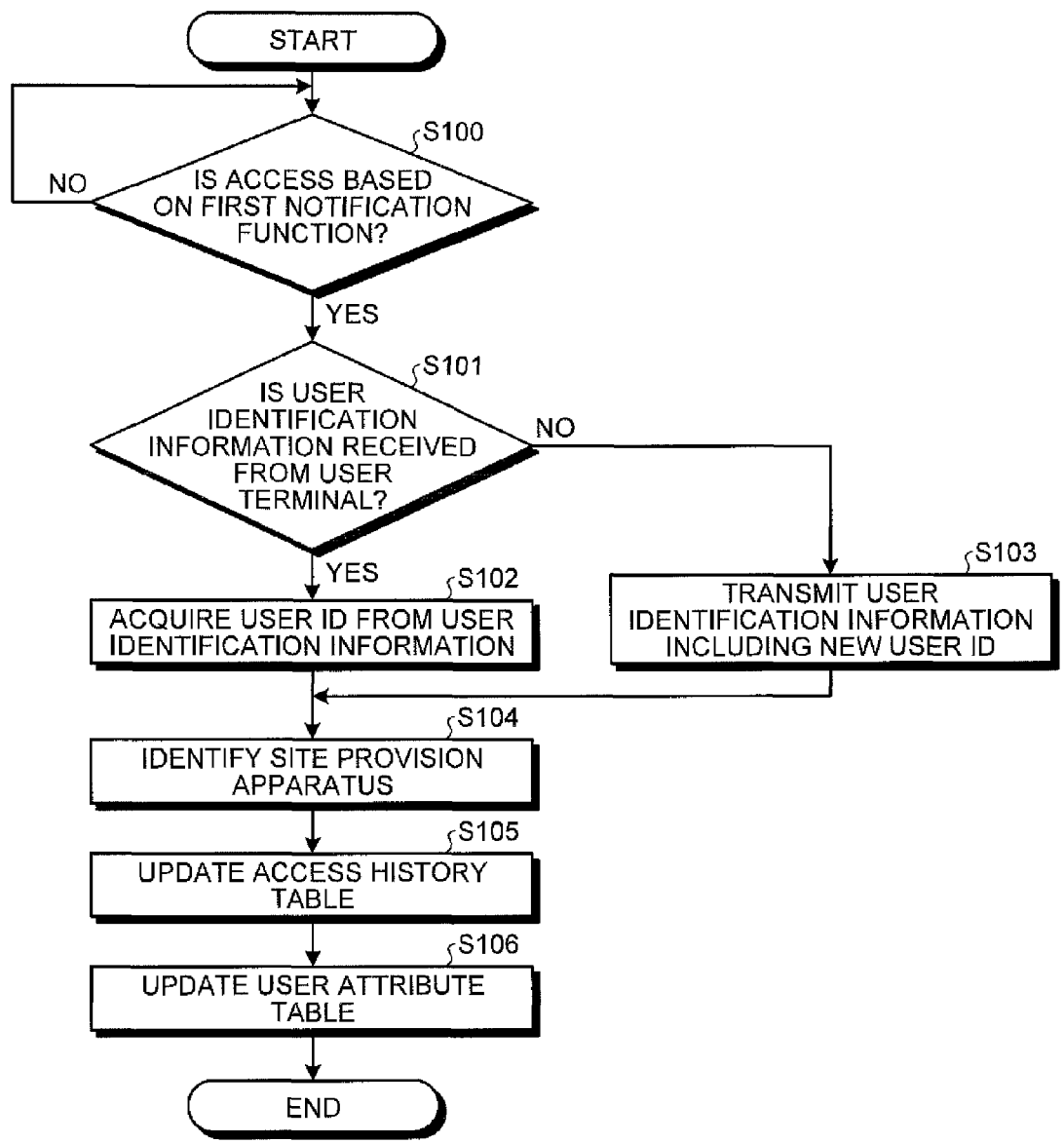
FIG. 8 is a flowchart illustrating the procedure of an attribute information update process of the information provision apparatus according to the first embodiment.

As illustrated in FIG. 8, the acquiring unit 131 of the information provision apparatus 100 determines whether the user terminal 20 performs access based on the first notification function (Step S100). For example, the acquiring unit 131 determines whether access is performed based on the web beacon inserted into the site page provided by the site provision apparatus 10. In this process, when the user terminal 20 does not perform the access based on the first notification function (Step S100, No), the acquiring unit 131 waits until the access based on the first notification function is performed.

On the other hand, when the user terminal 20 performs the access based on the first notification function (Step S100, Yes), the acquiring unit 131 determines whether the user identification information is received from the user terminal 20 (Step S101). For example, the acquiring unit 131 determines whether a cookie is received from the user terminal 20.

When the user identification information is received from the user terminal 20 (Step S101, Yes), the acquiring unit 131 acquires the user ID of the user terminal 20 from the acquired user identification information (Step S102). On the other hand, when the user identification information is not received from the user terminal 20 (Step S101, No), the acquiring unit 131 generates user identification information, such as a cookie including a new user ID, which is not included in the access history table 121 and transmits the generated user identification information to the user terminal 20 (Step S103).

Then, the acquiring unit 131 identifies the site provision apparatus 10 which has provided the site page including the first notification function accessed by the user terminal 20 (Step S104). Specifically, since the acquiring unit 131 receives the identification information of the site provision apparatus 10 from the user terminal 20 which has performed the access based on the first notification function, it identifies the site provision apparatus 10 on the basis of the identification information. For example, when the user terminal 20 performs the access based on the first notification function, it adds the identification information of the site provision apparatus 10 and the access unique information which is unique to each access to the site page to the URL of the access destination and accesses the information provision apparatus 100. When the user terminal 20 performs the access based on the first notification function, the acquiring unit 131 identifies the site provision apparatus 10 accessed by the user terminal 20, on the basis of the identification information of the site provision apparatus 10 or the access unique information to the site page.

Then, the acquiring unit 131 updates information which corresponds to the user ID of the user terminal 20 acquired in Step S102 or the user ID of the user terminal 20 newly given in Step S103 and also corresponds to the site provision apparatus 10 acquired in Step S104 in the access history table 121 (Step S105). For example, when the access history table 121 is in the state illustrated in FIG. 4 and the user terminal $20_1$ accesses the site provision apparatus $10_1$, the acquiring unit 131 updates the information about the number of accesses which corresponds to a user ID "$20_1$" and access destination information "$10_1$" from "10" to "11".

Then, the generating unit 132 updates the user attribute table 122 on the basis of the access history table 121 updated by the acquiring unit 131 (Step S106). Specifically, the generating unit 132 generates the psychographic attributes corresponding to the user ID on the basis of various kinds of information which correspond to the user ID updated by the acquiring unit 131 in the access history table 121 and stores the generated attribute information in the user attribute table 122. When the update of the user attribute table 122 is completed, the generating unit 132 ends the attribute information update process.

In some cases, the site provision apparatus 10 stores the attribute information (the psychographic attributes or the demographic attributes) of the user who is a member of the site page. In this case, when the user terminal 20 performs the access based on the first notification function, the site provision apparatus 10 may transmit the access unique information corresponding to the access of the user terminal 20 to the site page and the attribute information (the psychographic attributes or the demographic attributes) of the user terminal 20 to the information provision apparatus 100. In this case, the acquiring unit 131 of the information provision apparatus 100 specifies the user terminal 20 which performs the access based on the first notification function inserted into the site page which corresponds to the access unique information received from the site provision apparatus 10. Then, the acquiring unit 131 stores the attribute information (the psychographic attributes or the demographic attributes) received from the site provision apparatus 10 in the access history table 121 so as to be associated with the user ID of the user terminal 20 which performs the access, which is not illustrated in FIG. 4. In this case, the generating unit 132 integrates the attribute information stored in the access history table 121 to generate and update the user attribute table 122.

In this embodiment, whenever the access history table 121 is updated, the generating unit 132 updates the user attribute table 122. However, the generating unit 132 may update the user attribute table 122 whenever a predetermined number of information items in the access history table 121 are updated. In addition, the generating unit 132 may update the user attribute table 122 whenever a predetermined number of information items corresponding to each user ID included in the access history table 121 are updated.

The generating unit 132 may use various methods as a method of generating the user attribute table 122 on the basis of the access history table 121, that is, a method of estimating the attribute information of the user on the basis of the access history of the user to the web site. For example, it is assumed that the site provision apparatus $10_1$ provides a site page related to "cosmetics". In this case, when the user terminal $20_1$ accesses the site provision apparatus $10_2$, the generating unit 132 can presume that the user of the user terminal $20_1$ is interested in "cosmetics". In this case, the generating unit 132 may presume that the sex of the user of the user terminal $20_1$ is a "female". As such, the generating unit 132 may estimate the demographic attributes on the basis of the access history. In this example, the generating unit 132 updates information about the "cosmetics" and "sex" corresponding to the user ID "$20_1$" in the user attribute table 122 to "1".

For example, it is assumed that the site provision apparatus $10_1$ provides a site page related to "cosmetics" and the site provision apparatus $10_3$ provides a site page related to "women's clothes". In this case, when the user terminal $20_1$ accesses the site provision apparatuses $10_1$ and $10_3$, the generating unit 132 can presume that the sex of the user of the user terminal $20_1$ is a "female". Here, the generating unit 132 can accurately presume that the sex of the user of the user terminal $20_1$ is a "female" by integrating information indicating that the user terminal $20_1$ has accessed the site provision apparatus $10_2$, information indicating that the user terminal $20_1$ has accessed the site provision apparatus $10_1$, and information indicating that the user terminal $20_1$ has accessed the site provision apparatus $10_3$. That is, as the generating unit 132 integrates a larger amount of user information acquired by the acquiring unit 131, it can estimate the attribute information of the user with higher accuracy. In this example, the generating unit 132 updates information about the "sex" corresponding to the user ID "$20_1$" in the user attribute table 122 to "1".

As such, the acquiring unit 131 acquires the user ID of the user terminal 20 from the user identification information, such as the cookie acquired from the user terminal 20 which has performed the access based on the first notification function, and acquires the information of the site provision apparatus 10 accessed by the user terminal 20. Then, the acquiring unit 131 generates and updates the access history table 121 on the basis of the acquired information. The generating unit 132 generates and updates the user attribute table 122.

Various methods may be used as a method of generating the user attribute table 122 on the basis of the access history table 121. For example, a collaborative filtering technique may be used which separately stores the preference information of an unspecified number of users (for example, product purchase history information or site access history information) in the user information DB 120 and estimates user attributes on the basis of the preference information.

1-7. Operation (Information Provision Process)

Next, the procedure of an information provision process of the information provision apparatus 100 according to the first embodiment will be described with reference to FIG. 9. The information provision process is repeatedly performed by the control unit 130.

Figure 9:
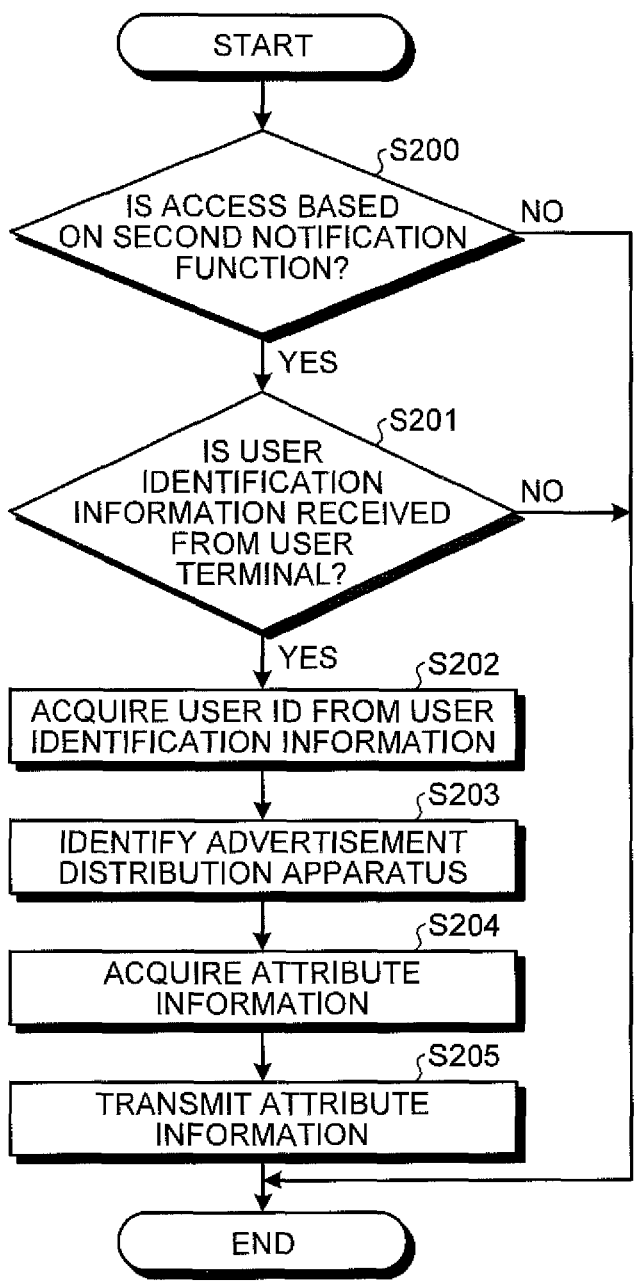
FIG. 9 is a flowchart illustrating the procedure of an information provision process of the information provision apparatus according to the first embodiment.

As illustrated in FIG. 9, the request response unit 133 of the control unit 130 determines whether the user terminal 20 performs the access based on the second notification function (Step S200). For example, the request response unit 133 determines whether the user terminal 20 performs the access, on the basis of the web beacon inserted into the portal page provided by the advertisement distribution apparatus 200. In the process, when the user terminal 20 does not perform the access based on the second notification function (Step S200, No), the request response unit 133 ends the information provision process.

On the other hand, when the user terminal 20 performs the access based on the second notification function (Step S200, Yes), the request response unit 133 determines whether user identification information, such as a cookie, is received from the user terminal 20 which has performed the access based on the second notification function (Step S201). In the process, when the user identification information is received (Step S201, Yes), the request response unit 133 acquires the user ID of the user terminal 20 from the received user identification information (Step S202).

Then, the request response unit 133 identifies the advertisement distribution apparatus 200 which provides the portal page including the second notification function accessed by the user terminal 20 (Step S203). Specifically, since the request response unit 133 receives the identification information of the advertisement distribution apparatus 200 from the user terminal 20 which has performed the access based on the second notification function, it identifies the advertisement distribution apparatus 200 on the basis of the identification information. For example, when the user terminal 20 performs the access based on the second notification function, it adds the identification information of the advertisement distribution apparatus 200 and the access unique information which is unique to each access to the portal page to the URL of the access destination and accesses the information provision apparatus 100. When the user terminal 20 performs the access based on the second notification function, the request response unit 133 identifies the advertisement distribution apparatus 200 accessed by the user terminal 20, on the basis of the identification information of the advertisement distribution apparatus 200 or the access unique information to the portal page.

Then, the request response unit 133 extracts the attribute information corresponding to the user ID of the user terminal 20 which has performed the access based on the second notification function from the user attribute table 122 (Step S204). Specifically, the request response unit 133 extracts the psychographic attributes and the demographic attributes which are stored in the user attribute table 122 so as to be associated with the user ID of the user terminal 20 which has performed the access based on the second notification function.

Then, the request response unit 133 transmits the attribute information extracted from the user attribute table 122 and the access unique information to the advertisement distribution apparatus 200 identified in Step S203 (Step S205).

Then, the advertisement distribution apparatus 200 receives the attribute information (user information) and the access unique information from the information provision apparatus 100. Then, the distribution unit 233 of the advertisement distribution apparatus 200 specifies the user terminal 20 which has accessed the portal page including the second notification function on the basis of the received access unique information and distributes advertisement content corresponding to the attribute information transmitted from the information provision apparatus 100 to the user terminal 20. Then, the user terminal 20 receives the portal page including the advertisement content from the advertisement distribution apparatus 200 and displays the portal page on, for example, the browser.

In FIG. 9, the attribute information including the "psychographic attributes" and the "demographic attributes" is given as an example of the user information transmitted from the information provision apparatus 100 to the advertisement distribution apparatus 200, but the user information is not limited to the attribute information. For example, the user information transmitted from the information provision apparatus 100 to the advertisement distribution apparatus 200 may be attribute information including the "psychographic attributes" or the "demographic attributes".

1-8. Operation (Determination Process and Distribution Process)

Next, a determination process and a distribution process of the advertisement distribution apparatus 200 according to the first embodiment will be described with reference to FIG. 10.

Figure 10:
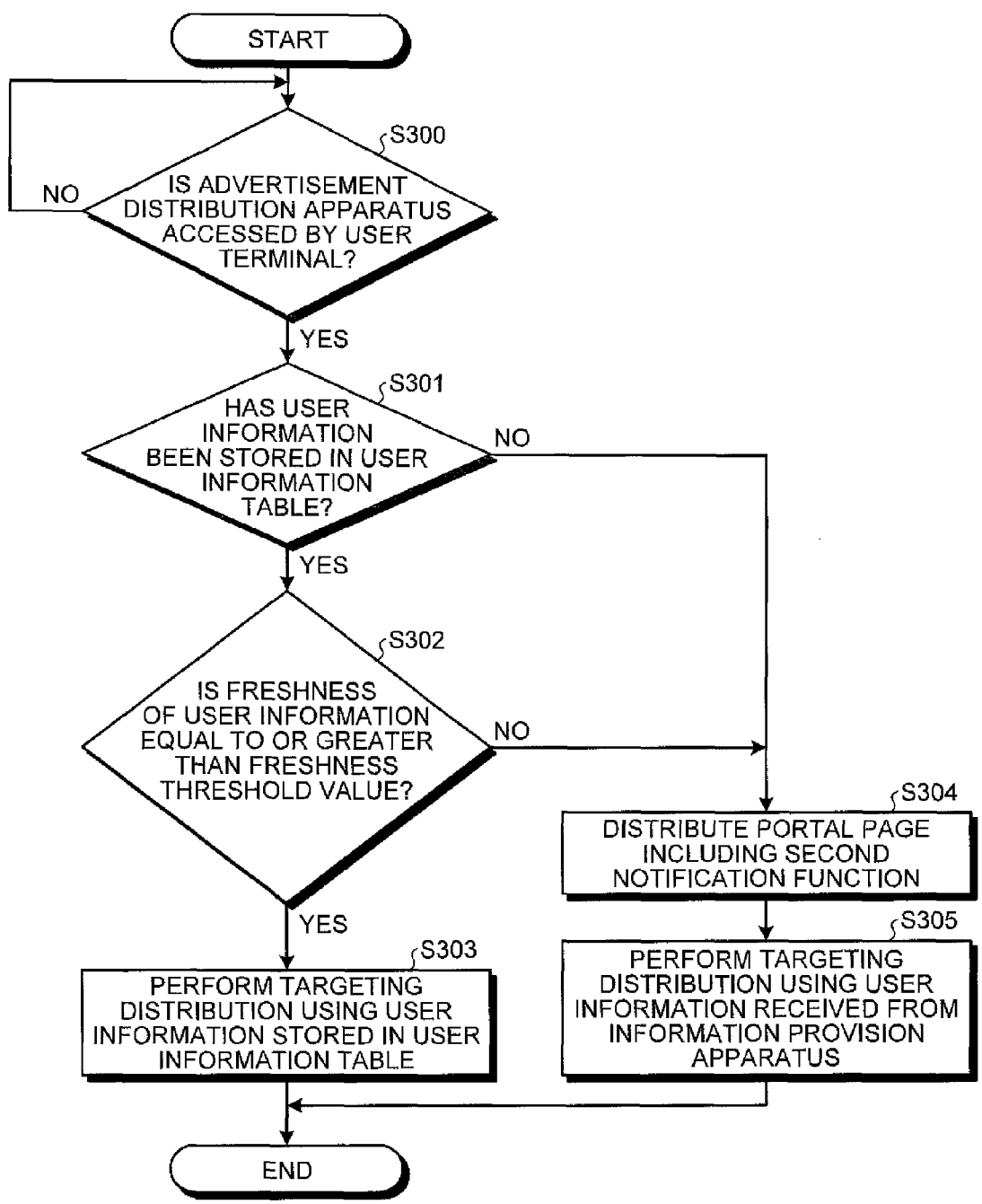
FIG. 10 is a flowchart illustrating the procedure of a determination process and a distribution process of the advertisement distribution apparatus according to the first embodiment.

As illustrated in FIG. 10, the control unit 230 of the advertisement distribution apparatus 200 determines whether the user terminal 20 accesses the advertisement distribution apparatus 200 (Step S300). Specifically, the control unit 230 determines whether a request to acquire the portal page is received from the user terminal 20. When the user terminal 20 does not access the advertisement distribution apparatus 200 (Step S300, No), the control unit 230 waits until the user terminal 20 accesses the advertisement distribution apparatus 200.

On the other hand, when the user terminal 20 accesses the advertisement distribution apparatus 200 (Step S300, Yes), the determining unit 231 determines whether the user information of the user terminal 20 has been stored in the user information table 221 (Step S301). When the user information has been stored in the user information table 221 (Step S301, Yes), the determining unit 231 determines whether the freshness of the user information is equal to or greater than a predetermined freshness threshold value (Step S302).

Specifically, the determining unit 231 acquires the update date corresponding to the user information of the user terminal 20 from the user information table 221 and calculates the number of days elapsed from the acquired update date to the present day as freshness information. Then, the determining unit 231 determines whether the number of days elapsed is less than a predetermined value. In this case, when the number of days elapsed is less than the predetermined value, the determining unit 231 determines that the freshness of the user information is equal to or greater than the freshness threshold value. When the number of days elapsed is equal to or greater than the predetermined value, the determining unit 231 determines that the freshness of the user information is less than the freshness threshold value.

When the determining unit 231 determines that the freshness of the user information is equal to or greater than the freshness threshold value (Step S302, Yes), the distribution unit 233 performs targeting distribution using the user information stored in the user information table 221 (Step S303). That is, the distribution unit 233 distributes a portal page including the advertisement content corresponding to the user who accesses the advertisement distribution apparatus 200 in Step S300 to the user terminal 20.

As such, in the first embodiment, the determining unit 231 determines the freshness (the number of days elapsed) of the user information stored in the user information table 221, in addition to determining whether the user information has been stored in the user information table 221. When the freshness of the user information is high, the distribution unit 233 performs the targeting distribution using the user information. In this case, when the freshness of the user information stored in the user information table 221 is equal to or greater than the freshness threshold value, the request unit 232 does not perform the process of requesting the information provision apparatus 100 to transmit the user information.

When the user information has not been stored in the user information table 221 (Step S301, No), or when the user information has been stored in the user information table 221, but the freshness of the user information is less than the freshness threshold value (Step S302, No), the request unit 232 requests the information provision apparatus 100 to transmit the user information. Specifically, the request unit 232 instructs the distribution unit 233 to distribute the portal page including the second notification function to the user terminal 20. Then, the distribution unit 233 distributes the portal page including the second notification function to the user terminal 20 (Step S304). That is, the request unit 232 transmits a request to acquire the user information to the information provision apparatus 100 through the user terminal 20.

Then, the request unit 232 acquires the user information of the user terminal 20 which has accessed the advertisement distribution apparatus 200 in Step S300 from the information provision apparatus 100 when the information provision process illustrated in FIG. 9 is performed by the information provision apparatus 100. In this case, as described in Step S305 of FIG. 9, the request unit 232 acquires the user information from the information provision apparatus 100 and the access unique information for identifying the access in Step S300. Then, the distribution unit 233 specifies the user terminal 20 which has accessed the advertisement distribution apparatus 200 in Step S300, on the basis of the access unique information acquired by the request unit 232. In addition, the distribution unit 233 performs the targeting distribution for the specified user terminal 20, using the user information acquired by the request unit 232 (Step S305).

In Step S304, the advertisement distribution apparatus 200 provides a portal page including an advertisement frame for displaying advertisement content and a portal content frame for displaying various kinds of content (for example, news and links to other sites) other than the advertisement content to the user terminal 20. At that time, the user terminal 20 displays a portal page in which no advertisement content is displayed in the advertisement frame on the browser. Then, in Step S305, when the advertisement content is distributed from the advertisement distribution apparatus 200, for example, the user terminal 20 reloads only the advertisement frame in the portal page to display the advertisement content in the advertisement frame.

Alternatively, in Step S304, the advertisement distribution apparatus 200 may provide a portal page in which the advertisement frame is set so as to be redirected to a predetermined URL of the advertisement distribution apparatus 200 to the user terminal 20. In this case, the user terminal 20 displays the portal page in which no advertisement content is displayed in the advertisement frame on the browser. When the advertisement frame is displayed, the user terminal 20 accesses the predetermined URL. Then, when the predetermined URL is accessed by the user terminal 20 by the redirect function set to the advertisement frame, the advertisement distribution apparatus 200 may distribute the advertisement content to the user terminal 20 in response to the access. In this way, the user terminal 20 can display the advertisement content distributed from the advertisement distribution apparatus 200 in the advertisement frame, without reloading the advertisement frame.

As such, when the freshness of the user information stored in the host apparatus (advertisement distribution apparatus 200) is high, the advertisement distribution apparatus 200 according to the first embodiment does not acquire the user information from the information provision apparatus 100. Therefore, the advertisement distribution apparatus 200 can reduce the amount of user information acquired from the information provision apparatus 100. As a result, it is possible to reduce the amount of money paid to the information provision apparatus 100. In addition, since the advertisement distribution apparatus 200 according to the first embodiment determines the freshness of the user information in addition to determining whether the user information has been stored in the user information table 221, it is possible to prevent targeting distribution using the user information with low freshness. As a result, it is possible to perform accurate targeting distribution.

1-9. Effects

As described above, in the advertisement distribution apparatus 200 according to the first embodiment, the user information table 221 stores the user information about the user. When the user terminal 20 accesses the advertisement distribution apparatus 200, the determining unit 231 determines whether the user information (an example of the attribute information) about the user of the user terminal 20 has been stored in the user information table 221. When the determining unit 231 determines that the user information has not been stored, the request unit 232 requests the information provision apparatus 100 which stores predetermined user information to transmit the user information of the user terminal 20. When the determining unit 231 determines that the user information has not been stored, the distribution unit 233 distributes advertisement content to the user terminal 20 using the user information which is acquired from the information provision apparatus 100 by the request unit 232. When the determining unit 231 determines that the user information has been stored, the distribution unit 233 distributes the advertisement content using the user information stored in the user information table 221.

In this way, the advertisement distribution apparatus 200 according to the first embodiment can reduce the amount of user information acquired from the information provision apparatus 100. In the case of the measured rate system, it is possible to reduce the amount of money paid to the information provision apparatus 100. In addition, since the advertisement distribution apparatus 200 does not constantly acquire the user information from the information provision apparatus 100, it is possible to reduce the load of the communication network 40.

In the advertisement distribution apparatus 200 according to the first embodiment, the user information table 221 stores the freshness information (an example of the update date) indicating the freshness of the user information so as to be associated with the user information. When the user information of the user terminal 20 has been stored in the user information table 221, the determining unit 231 determines whether the freshness information corresponding to the user information is equal to or greater than the freshness threshold value. When the determining unit 231 determines that the freshness information is less than the freshness threshold value, the request unit 232 requests the information provision apparatus 100 to transmit the user information.

Therefore, the advertisement distribution apparatus 200 according to the first embodiment can prevent targeting distribution using the user information with low freshness. As a result, it is possible to perform accurate targeting distribution.

1-10. Other Embodiments

In the first embodiment, the user information table 221 stores the update date as the freshness information. However, the user information table 221 may store an index value indicating the freshness of the user information as the freshness information. For example, the user information table 221 may include a "freshness information" item, in addition to the "update date" item, and the control unit 230 periodically updates the "freshness information" in the user information table 221. Specifically, the control unit 230 may calculate the index value indicating the freshness of each user information item in the user information table 221, on the basis of the number of days elapsed from the update date to the present day, and store the calculated index value in the freshness information. In this case, the advertisement distribution apparatus 200 can reduce the load applied to the determination process described with reference to FIG. 10. Therefore, it is possible to reduce the response time from the access of the user terminal 20 to the distribution of the portal page.

In the first embodiment, the determining unit 231 determines whether the user information has been stored in the user information table 221. However, the determining unit 231 may determine whether the number of attributes stored in the user information table 221 is equal to or greater than a predetermined value. For example, in the example illustrated in FIG. 7, the user information table 221 stores three attributes ("clothes", "sex", and "age") corresponding to the user ID "U11" and stores four attributes ("cosmetics", "car", "travel", and "age") corresponding to the user ID "U12". Here, it is assumed that the number of attributes in which "1" is stored among the psychographic attributes and the number of attributes in which "x" is not stored among the demographic attributes are counted. In this example, when the user terminal 20 with the user ID "U11" accesses the advertisement distribution apparatus 200, the determining unit 231 determines whether the number of attributes, "3", corresponding to the user terminal 20 is equal to or greater than a predetermined value. When the determining unit 231 determines that the number of attributes is equal to or greater than the predetermined value, the request unit 232 does not request the information provision apparatus 100 to transmit the user information. When the determining unit 231 determines that the number of attributes is not equal to or greater than the predetermined value, the request unit 232 requests the information provision apparatus 100 to transmit the user information.

As such, the advertisement distribution apparatus 200 determines whether to acquire the user information from the information provision apparatus 100 on the basis of whether a sufficient number of attributes are stored in the user information table 221 in order to perform accurate targeting distribution. Therefore, the advertisement distribution apparatus 200 can perform accurate targeting distribution.

In the first embodiment, the user information table 221 stores the update date for each user ID. However, the user information table 221 may store the update date for each user attribute. For example, in the example illustrated in FIG. 7, the user information table 221 may store the update date corresponding to the psychographic attributes and the update date corresponding to the demographic attributes. In addition, for example, the user information table 221 may store the update date for each attribute. Specifically, the user information table 221 stores different update dates for the attributes "cosmetics", "car", "clothes", and "travel" among the psychographic attributes and stores different update dates for the attributes "sex" and "age" among the demographic attributes.

As in this example, when the user information table 221 stores the update date for each attribute, the determining unit 231 may extract the attribute in which the number of days elapsed from the update date to the present day is less than a predetermined value and determine whether the extracted number of attributes is equal to or greater than a predetermined value.

When the user information table 221 stores the update date for each attribute, the freshness threshold value may be different for each attribute. For example, since an invariable attribute, such as "sex", does not require high freshness, the freshness threshold value may be set to a small value. In addition, since a rapidly changeable attribute, such as the psychographic attribute, requires high freshness, the freshness threshold value may be set to a large value.

The determining unit 231 may determine whether to request the information provision apparatus 100 to transmit the user information on the basis of combinations of the attributes stored in the user information table 221. For example, when the number of attributes stored in the psychographic attributes is equal to or greater than a predetermined value and the number of attributes stored in the demographic attributes is equal to or greater than a predetermined value, the determining unit 231 determines that it is not necessary to request the information provision apparatus 100 to transmit the user information. On the other hand, when the number of attributes stored in the psychographic attributes is not equal to or greater than the predetermined value or when the number of attributes stored in the demographic attributes is not equal to or greater than the predetermined value, the determining unit 231 determines that it is necessary to request the information provision apparatus 100 to transmit the user information.

2. Second Embodiment

In a second embodiment, an example in which it is determined whether to acquire user information from an information provision apparatus 100 on the basis of the number of time the user information is acquired within a predetermined period. An advertisement distribution system 1 has the same structure as that illustrated in FIG. 2 and the information provision apparatus 100 has the same structure as that illustrated in FIG. 3. Therefore, the description of the advertisement distribution system 1 and the information provision apparatus 100 will not be repeated.

2-1. Structure of Advertisement Distribution Apparatus 200

Figure 11:
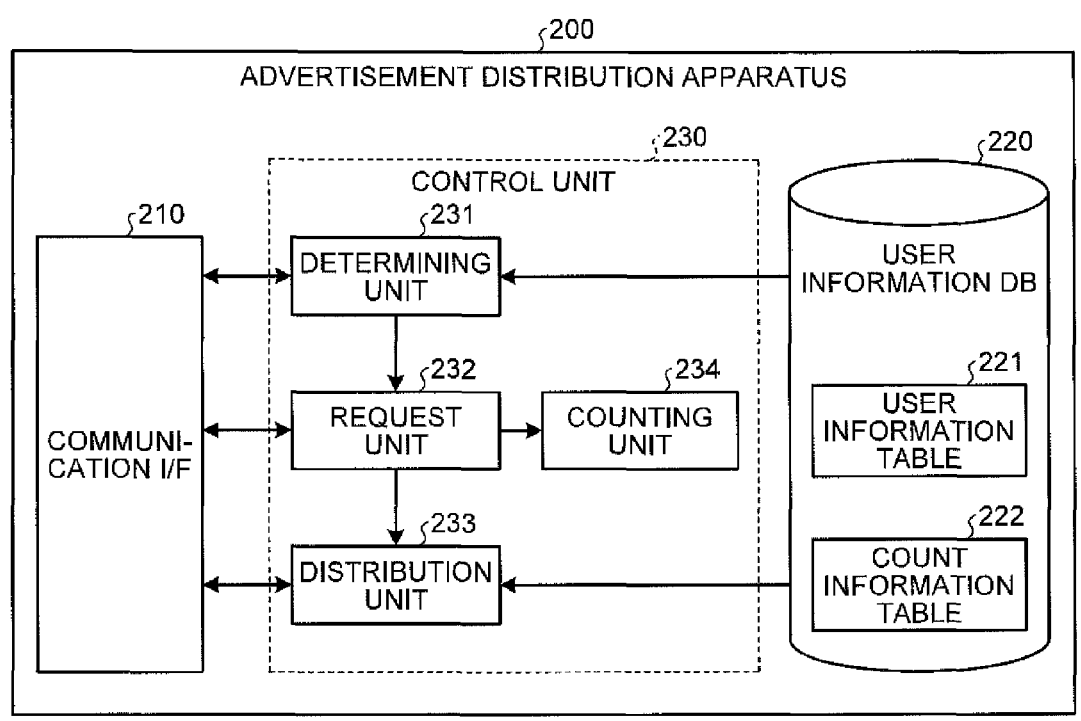
FIG. 11 is a diagram illustrating an example of the structure of an advertisement distribution apparatus according to a second embodiment.

FIG. 11 is a diagram illustrating an example of the structure of the advertisement distribution apparatus 200 according to the second embodiment. As illustrated in FIG. 11, a user information DB 220 includes a count information table 222. In addition, a control unit 230 includes a counting unit 234.

The count information table 222 stores the number of times the user information is acquired from the information provision apparatus 100 by a request unit 232 for each predetermined period. For example, the count information table 222 stores the number of acquisitions "1000" so as to be associated with a period "January 2012" or stores the number of acquisitions "300" so as to be associated with a period "February 2012".

The counting unit 234 counts the number of times the user information is acquired from the information provision apparatus 100 by the request unit 232. Specifically, the counting unit 234 increases the number of acquisitions corresponding to the period including the present day in the count information table 222 whenever the user information is acquired by the request unit 232.

For example, it is assumed that the count information table 222 stores the number of acquisitions for each month. As in the above-mentioned example, it is assumed that the count information table 222 stores the number of acquisitions "300" so as to be associated with the period "February 2012". In addition, it is assumed that the current date and time is "February 2012". In this situation, when the request unit 232 acquires the user information, the counting unit 234 updates the number of acquisitions "300" corresponding to the period "February 2012" to "301" in the count information table 222.

2-2. Operation (Determination Process and Distribution Process)

Next, the procedure of a determination process and a distribution process of the advertisement distribution apparatus 200 according to the second embodiment will be described with reference to FIG. 12. Steps S400 to S403 illustrated in FIG. 12 correspond to Steps S300 to S303 illustrated in FIG. 10 and Steps S405 and S407 illustrated in FIG. 12 correspond to Steps S304 and S305 illustrated in FIG. 10. Hereinafter, the detailed description of the process described with reference to FIG. 10 will not be repeated.

Figure 12:
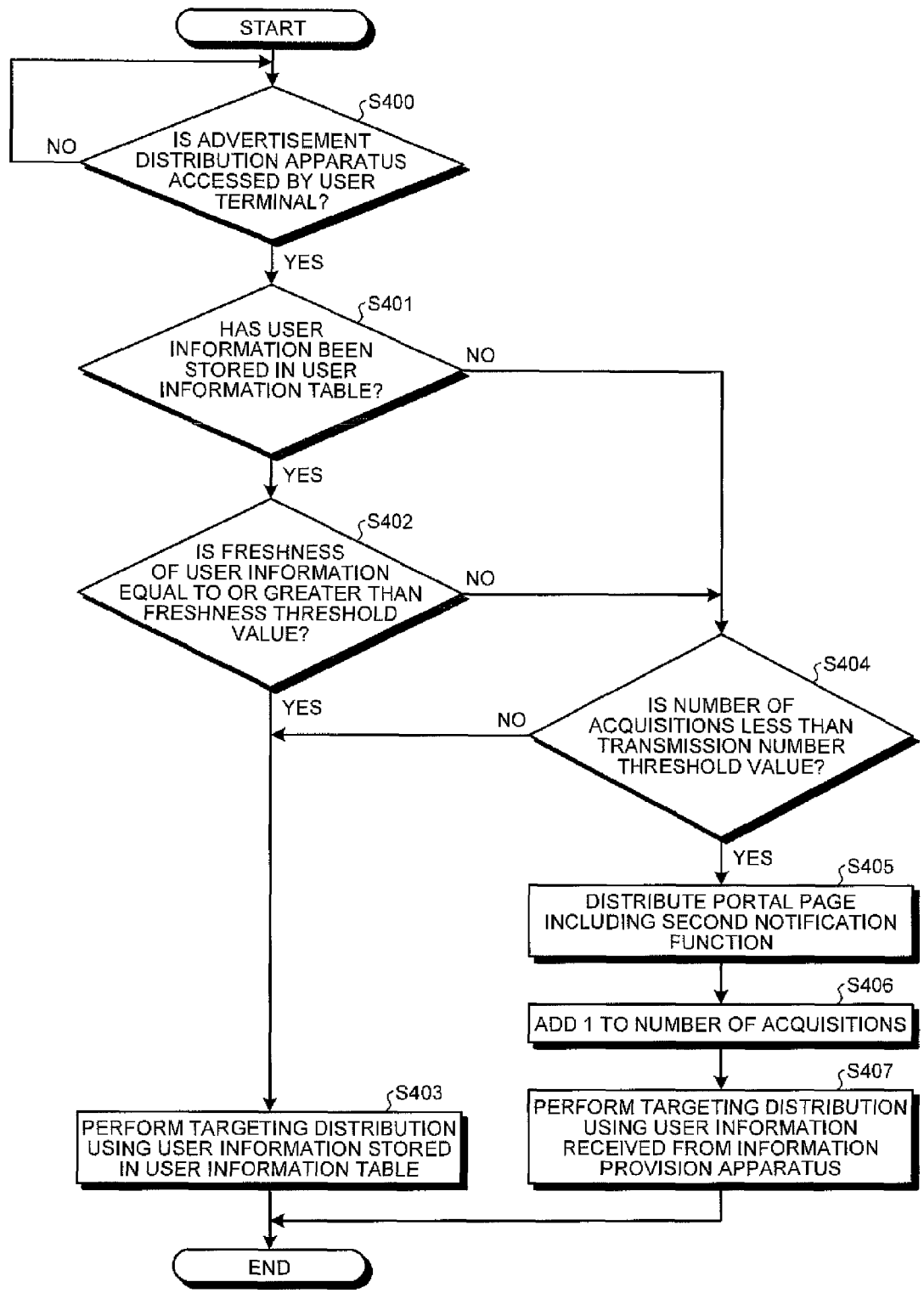
FIG. 12 is a flowchart illustrating the procedure of a determination process and a distribution process of the advertisement distribution apparatus according to the second embodiment.

As illustrated in FIG. 12, when the user information has not been stored in the user information table 221 (Step S401, No) or when the freshness of the user information stored in the user information table 221 is less than a freshness threshold value (Step S402, No), the determining unit 231 according to the second embodiment determines whether the number of acquisitions stored in the count information table 222 is less than a predetermined acquisition number threshold value (Step S404).

Specifically, in the second embodiment, the number of times the advertisement distribution apparatus 200 acquires the user information from the information provision apparatus 100 for a predetermined period is determined. For example, it is assumed that the number of times the advertisement distribution apparatus 200 acquires the user information is determined to be 1000 for a month. In this case, the determining unit 231 determines whether the number of acquisitions which is stored in the count information table 222 so as to be associated with the period including the present day is less than "1000".

When the determining unit 231 determines that the number of acquisitions is less than the acquisition number threshold value (Step S404, Yes), the request unit 232 instructs the distribution unit 233 to distribute a portal page including a second notification function (Step S405). In this case, the counting unit 234 adds "1" to the number of acquisitions in the count information table 222 (Step S406).

On the other hand, when the determining unit 231 determines that the number of acquisitions is equal to or greater than the acquisition number threshold value (Step S404, No), the request unit 232 does not instruct the distribution unit 233 to distribute the portal page including the second notification function. In this case, the distribution unit 233 performs targeting distribution using the user information stored in the user information table 221 (Step S403). When the user information has not been stored in the user information table 221, the distribution unit 233 selects advertisement content at random or on the basis of the content of the portal page and distributes the selected advertisement content to the user terminal 20.

2-3. Effects

As described above, in the advertisement distribution apparatus 200 according to the second embodiment, the counting unit 234 counts the number of times the user information is acquired from the information provision apparatus 100 by the request unit 232 for each predetermined period. When the user information of the user terminal 20 has been stored in the user information table 221, the determining unit 231 determines whether the number of acquisitions counted by the counting unit 234 is less than the acquisition number threshold value. When the determining unit 231 determines that the number of acquisitions is less than the acquisition number threshold value, the request unit 232 requests the information provision apparatus 100 to transmit the user information.

In this way, the advertisement distribution apparatus 200 according to the second embodiment can perform control such that the amount of money paid by the advertisement distributor to the information provider is within a predetermined range in the measured rate system. Specifically, in the measured rate system, it is assumed that the advertisement distributor pays the amount of money corresponding to the number of times the user information is acquired from the information provision apparatus 100 to the information provider. Therefore, when the advertisement distribution apparatus 200 according to the second embodiment is used, the advertisement distributor can set the threshold value of the number of acquisitions to a desired value to set the upper limit of the amount of money paid for a predetermined period.

2-4. Other Embodiments

In the second embodiment, it is determined whether to acquire the user information from the information provision apparatus 100 on the basis of the number of times the user information is acquired within a predetermined period. However, the counting unit 234 may calculate the estimated amount of money, which is the amount of money estimated to be paid to the information provision apparatus 100, for each predetermined period. In this case, the request unit 232 may acquire the user information from the information provision apparatus 100 while the estimated amount of money is equal to or less than a predetermined payment threshold value for a period including the present day and may not acquire the user information from the information provision apparatus 100 when the estimated amount of money is more than the payment threshold value.

For example, it is assumed that the amount of money paid is changed depending on the number of attributes in the user information transmitted from the information provision apparatus 100. In this case, the count information table 222 stores the estimated amount of money for each predetermined period. The counting unit 234 calculates the amount of money corresponding to the number of attributes in the user information whenever the user information is acquired from the information provision apparatus 100 and adds the calculated amount of money to the estimated amount of money stored in the count information table 222. Therefore, the request unit 232 can determine whether the user information is acquired, on the basis of the estimated amount of money paid to the information provision apparatus 100.

3. Third Embodiment

In a third embodiment, an example in which it is determined whether to acquire user information from an information provision apparatus 100 on the basis of whether advertisement content to be distributed can be extracted using the user information stored in a user information table 221 will be described.

3-1. Structure of Advertisement Distribution Apparatus 200

Figure 13:
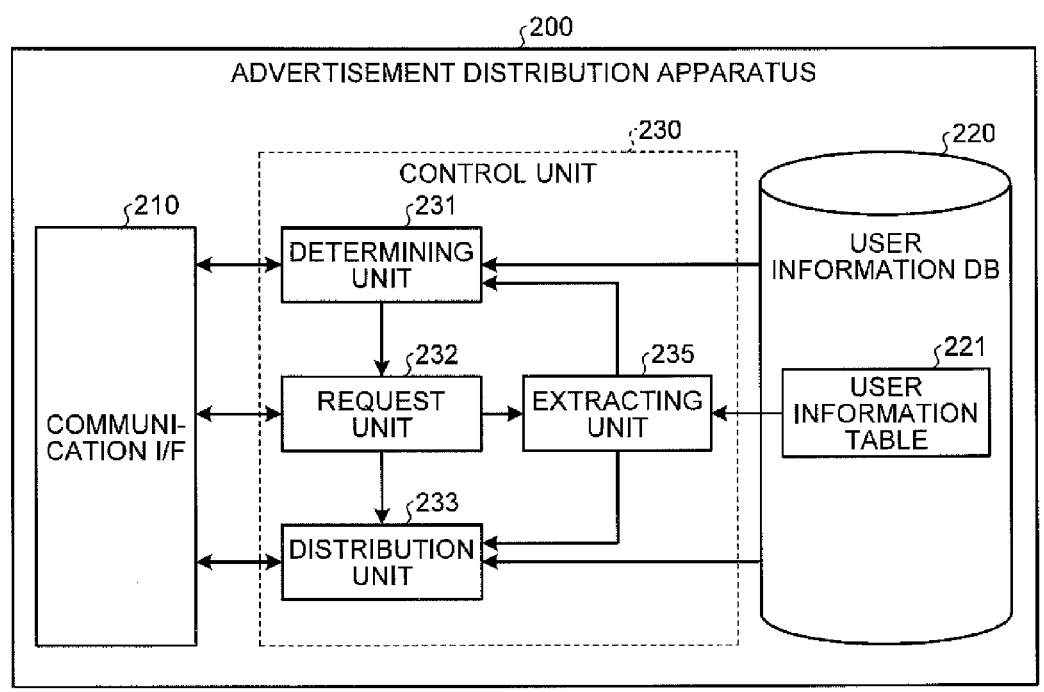
FIG. 13 is a diagram illustrating an example of the structure of an advertisement distribution apparatus according to a third embodiment.

FIG. 13 is a diagram illustrating an example of the structure of the advertisement distribution apparatus 200 according to the third embodiment. As illustrated in FIG. 13, a control unit 230 includes an extracting unit 235. The extracting unit 235 extracts the candidates of the advertisement content, which is a distribution target, on the basis of the user information stored in the user information table 221. Specifically, the extracting unit 235 performs an estimation process in the targeting distribution to extract the advertisement content matched with user preference. For example, when there is user information indicating high preference for a "car", the extracting unit 235 extracts the advertisement content related to the "car" as the distribution target.

When a request unit 232 acquires the user information from the information provision apparatus 100, the extracting unit 235 extracts advertisement content, which is a distribution target, using the acquired user information and the user information stored in the user information table 221.

3-2. Operation (Determination Process and Distribution Process)

Next, the procedure of a determination process and a distribution process of the advertisement distribution apparatus 200 according to the third embodiment will be described with reference to FIG. 14. Steps S500 to S502 and Steps S505 to S507 illustrated in FIG. 14 correspond to Steps S300 to S305 illustrated in FIG. 10. Hereinafter, the detailed description of the process described with reference to FIG. 10 will not be repeated.

Figure 14:
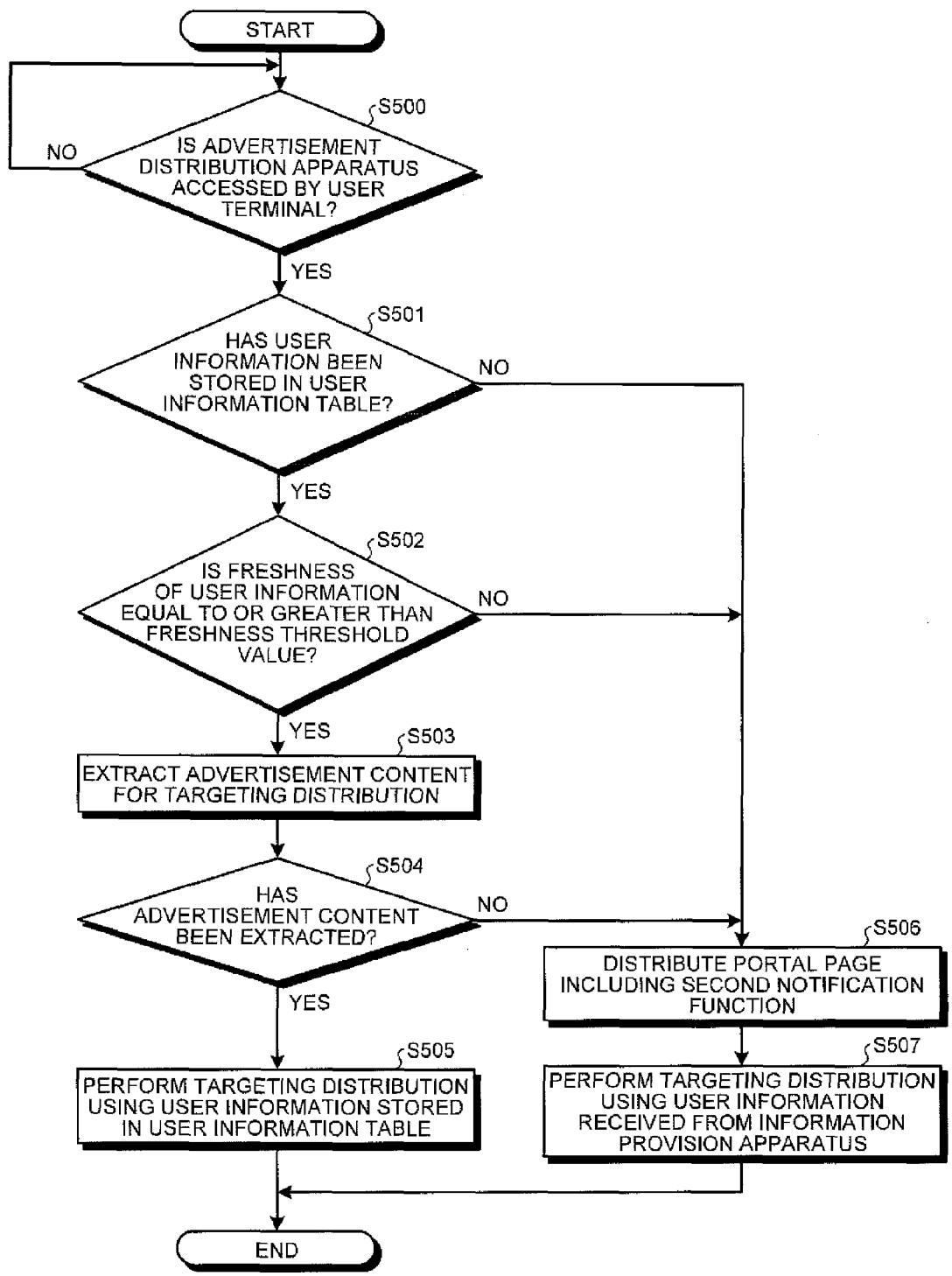
FIG. 14 is a flowchart illustrating the procedure of a determination process and a distribution process of the advertisement distribution apparatus according to the third embodiment.

As illustrated in FIG. 14, when the user information has been stored in the user information table 221 (Step S501, Yes) and when the freshness of the user information is equal to or greater than a threshold value (Step S502, Yes), the extracting unit 235 according to the third embodiment extracts advertisement content, which is a distribution target, using the user information stored in the user information table 221 (Step S503).

Then, a determining unit 231 determines whether the advertisement content, which is a distribution target, has been extracted by the extracting unit 235 (Step S504). When the advertisement content, which is a distribution target, has been extracted (Step S504, Yes), the distribution unit 233 performs targeting distribution using the user information stored in the user information table 221 (Step S505). That is, the distribution unit 233 distributes a portal page including the advertisement content extracted by the extracting unit 235 to a user terminal 20 (Step S505).

On the other hand, when the advertisement content, which is a distribution target, has not been extracted (Step S504, No), the request unit 232 requests the information provision apparatus 100 to transmit the user information (Step S506).

3-3. Effects

As described above, in the advertisement distribution apparatus 200 according to the third embodiment, the extracting unit 235 extracts the candidates of the advertisement content to be distributed by the distribution unit 233 using the user information of the user terminal 20 stored in the user information table 221. The determining unit 231 determines whether the advertisement content has been extracted by the extracting unit 235. When the determining unit 231 determines that the advertisement content has not been extracted, the request unit 232 requests the information provision apparatus 100 to transmit the user information.

Therefore, the advertisement distribution apparatus 200 according to the third embodiment can reduce the amount of user information acquired from the information provision apparatus 100 while ensuring the advertisement content to be displayed in the portal page.

3-4. Other Embodiments

In some cases, when it is difficult to extract the advertisement content, which is a distribution target, the advertisement distribution apparatus 200 randomly extracts the advertisement content. For example, in some cases, the advertisement distribution apparatus 200 extracts its company's advertisement content related to the advertisement distributor. In this case, the advertisement distribution apparatus 200 according to the third embodiment may acquire the user information from the information provision apparatus 100 when the advertisement content is randomly extracted or its company's advertisement content is extracted.

In some cases, the portal page provided by the advertisement distribution apparatus 200 includes a plurality of advertisement frames. In addition, in some cases, when it is difficult to extract the advertisement content, which is a distribution target, the advertisement distribution apparatus 200 does not randomly extract the advertisement content, but extracts its company's advertisement content. In this case, when it is difficult to extract advertisement content equal to or more than the number of advertisement frames included in the portal page, the advertisement distribution apparatus 200 according to the third embodiment may acquire the user information from the information provision apparatus 100. In this case, the advertisement distribution apparatus 200 may acquire the user information from the information provision apparatus 100 when the sum of the number of pieces of advertisement content, which are distribution targets, and the number of pieces of its company's advertisement content does not reach the number of advertisement frames. Alternatively, the advertisement distribution apparatus 200 may acquire the user information from the information provision apparatus 100 when the number of pieces of advertisement content, which are distribution targets, except for the number of pieces of its company's advertisement content, does not reach the number of advertisement frames. In this way, the advertisement distribution apparatus 200 according to the third embodiment can extract the advertisement content, which is a distribution target, on the basis of the user information acquired from the information provision apparatus 100. Therefore, it is possible to extract advertisement content to be displayed in a plurality of advertisement frames.

In the third embodiment, the advertisement distribution apparatus 200 includes the extracting unit 235. However, the extracting unit 235 may be integrated with the distribution unit 233. For example, in the first and second embodiments, the distribution unit 233 and the extracting unit 235 are integrated with each other. However, in the first and second advertisement distribution apparatuses 200, the extracting unit 235 may be separated from the distribution unit 233.

4. Fourth Embodiment

The advertisement distribution apparatus, the distribution method, and the distribution program according to the invention may have various other structures different from those according to the above-described embodiments. In a fourth embodiment, other structures will be described.

4-1. Process of Acquiring User Information

In the above-described embodiments, the portal page including the second notification function is distributed to the user terminal 20 to transmit a user information acquisition request to the information provision apparatus 100 and the user information is acquired from the information provision apparatus 100. In this embodiment, the advertisement distribution apparatus 200 may transmit an acquisition request including the attributes of the user information to the information provision apparatus 100 and acquire only the attributes which are lacking in the advertisement distribution apparatus 200 from the information provision apparatus 100.

For example, when insufficient attributes are specified, the advertisement distribution apparatus 200 inserts the second notification function of allowing the user terminal 20 to notify the information provision apparatus 100 of code values indicating the attributes in the portal page. As an example of the code values, it is considered that a code value "10" indicates psychographic attributes, a code value "11" indicates an attribute "cosmetics" in the psychographic attributes, a code value "20" indicates demographic attributes, and a code value "21" indicates an attribute "sex" in the demographic attributes. When the information provision apparatus 100 is notified of the code values by the user terminal 20, it provides only the user information of the attributes corresponding to the code values to the advertisement distribution apparatus 200. Therefore, the advertisement distribution apparatus 200 can reduce the amount of user information acquired from the information provision apparatus 100. As a result, it is possible to further reduce the amount of money paid to the information provision apparatus 100.

4-2. Process of Acquiring User Information

In the above-mentioned example, the advertisement distribution apparatus 200 notifies the information provision apparatus 100 of the code values indicating necessary attributes. However, the information provision apparatus 100 may be notified of insufficient attributes by the advertisement distribution apparatus 200 in advance. For example, when all attributes related to the psychographic attributes are lacking, the advertisement distribution apparatus 200 transmits a notice indicating the psychographic attributes are lacking to the information provision apparatus 100 in advance. In this case, when the user terminal 20 has performed the access based on the second notification function, the information provision apparatus 100 provides the psychographic attributes of the user terminal 20 to the advertisement distribution apparatus 200.

4-3. Transmission Aspect of Acquisition Request

In the above-described embodiments, the advertisement distribution apparatus 200 acquires the user information from the information provision apparatus 100 through the user terminal 20 using the second notification function. However, in this embodiment, when both the information provision apparatus 100 and the advertisement distribution apparatus 200 identify each user using the same user ID, the advertisement distribution apparatus 200 can acquire the user information from the information provision apparatus 100, without using the second notification function.

In this example, when the user information of the user terminal 20 which has accessed the portal page has not been stored in the user information table 221, the advertisement distribution apparatus 200 does not distribute the portal page including the second notification function to the user terminal 20, but directly transmits a request to acquire user information including the user ID of the user terminal 20 to the information provision apparatus 100. When receiving the user information acquisition request from the advertisement distribution apparatus 200, the information provision apparatus 100 provides the user information corresponding to the user ID included in the acquisition request to the advertisement distribution apparatus 200. Therefore, the advertisement distribution apparatus 200 can acquire the user information from the information provision apparatus 100, without passing through the user terminal 20, and perform targeting distribution using the acquired user information.

4-4. Structure of System

In the above-described embodiments, the advertisement distribution apparatus 200 acquires the attribute information matched with the user ID of the user terminal 20 which has accessed the portal site from the information provision apparatus 100 and performs the targeting distribution using the acquired attribute information. However, the information provision apparatus 100 may model, for example, the preference of the user using the user information which is constantly received by the access based on the first notification function and provide the user information using the model. That is, when the psychographic attributes matched with the user ID of the user terminal 20 which has accessed the portal page are not stored, the information provision apparatus 100 may transmit the psychographic attributes of another user close to those of the user to the advertisement distribution apparatus 200.

4-5. Information Provision Process

In the above-described embodiments, the information provision apparatus 100 transmits the user information to the advertisement distribution apparatus 200. However, for example, the access history information of the user may be transmitted from the information provision apparatus 100 to the advertisement distribution apparatus 200. In this case, the advertisement distribution apparatus 200 selects advertisement content on the basis of the access history information of the user and distributes the selected advertisement content.

In the above-described embodiments, the user information based on the access history is provided to the advertisement distribution apparatus 200 while the history of the access of the user terminal 20 to the site provision apparatus 10 is sequentially acquired. However, when a predetermined amount of user information is allocated to the advertisement distribution apparatus 200, the user information based on the access history at a given point of time may be provided to the advertisement distribution apparatus 200.

4-6. Access History Table

In the above-described embodiments, the access history table 121 stores the number of accesses to each site provision apparatus 10. However, the access history table 121 may store the number of accesses to each site page (URL) of each site provision apparatus 10. In this case, it is possible to accurately determine the attribute information of the user. The number of accesses to each site page may be counted by, for example, including the identification information of the site provision apparatus 10 into the first notification function and inserting the identification information of the site page into the first notification function.

The access history table 121 may store, for example, the access date and time when the user terminal 20 accesses the site page and the time for which the user terminal 20 accesses the site page. In this case, the information provision apparatus 100 can determine the attribute information of the user with high accuracy.

4-7. User Attribute Table

In the above-described embodiments, the user attribute table 122 stores the attributes illustrated in FIG. 5. However, when the advertisement distribution system 1 includes a plurality of advertisement distribution apparatuses 200, the user attribute table 122 may store different attributes for each advertisement distribution apparatus 200 or one or more advertisement distribution apparatuses 200. In this case, the information provision apparatus 100 can provide user information corresponding to the advertisement distribution apparatus 200.

4-8. First Notification Function

In the above-described embodiments, the first notification function is inserted into the site page provided by the site provision apparatus 10. However, the first notification function may be inserted into HTML mail, such as a mail magazine distributed to the user terminal 20 by a mail provision apparatus. In this case, the information provision apparatus 100 can also collect the user information from the user terminal 20 which has received the HTML mail. Therefore, it is possible to determine the attribute information of the user with high accuracy.

4-9. Advertisement

In the above-described embodiments, the advertisement content distributed from the advertisement distribution apparatus 200 to the user terminal 20 is the banner advertisement. However, the advertisement content is not limited to the banner advertisement. For example, the advertisement content distributed from the advertisement distribution apparatus 200 to the user terminal 20 may be a video advertisement, a text advertisement, or a voice advertisement.

In the above-described embodiments, the advertisement content is distributed from the advertisement distribution apparatus 200 to the user terminal 20. However, for example, an advertisement server apparatus other than the advertisement distribution apparatus 200 may distribute the advertisement content. For example, when the advertisement distribution apparatus 200 performs targeting distribution for the user terminal 20, it may provide, to the user terminal 20, a portal page in which a URL for accessing distribution target advertisement content stored in the advertisement server apparatus is described. In this case, when acquiring the portal page from the advertisement distribution apparatus 200, the user terminal 20 accesses the URL described in the portal page to acquire the advertisement content from the advertisement server apparatus.

4-10. Others

Some embodiments of the invention have been described in detail above with reference to the drawings. The embodiments are illustrative, and various modifications and changes of the invention including the aspects described in the Detailed Description of the Embodiments can be made on the basis of knowledge of those skilled in the art.

The information provision apparatus 100 or the advertisement distribution apparatus 200 may be implemented by a plurality of server computers and the structure of the system may be flexibly changed depending on the functions. For example, an external platform may be called by an API (Application Programming Interface) or network computing and then implemented.

In the claims, a "unit" can be replaced with a "section", a "module" or a "circuit". For example, a determining unit can be replaced with a determining module or a determining circuit.

According to an aspect of an embodiment, the advertisement distribution apparatus can reduce the amount of money paid to the information provider.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A webpage request handling apparatus comprising:
a memory that stores a database of user information associated with first user identification information of users who have previously accessed the webpage request handling apparatus; and
a processor coupled to the memory and programmed to:
when a user terminal requests a webpage over a network:
determine whether first user identification information corresponding to a user of the user terminal has been previously-stored in the database;
upon a determination that the first user identification information corresponding to the user of the user terminal has not been previously-stored in the database:
provide a webpage including a web beacon to the user terminal, via the network, the web beacon causing the user terminal to: access an information provision apparatus, and to notify the information provision apparatus of whether the user terminal has an information provision apparatus-generated cookie, the information provision apparatus-generated cookie including second user identification information that: (i) is different than the first user identification information, and (ii) identifies the user of the user terminal, the information provision apparatus generating the cookie including the second user identification information, when the user first accesses the information provision apparatus;
receive, from the information provision apparatus, user information corresponding to the second user identification information; and
distribute advertisement content to the user terminal based on the received user information corresponding to the second user identification information acquired from the information provision apparatus; and
upon a determination that the first user identification information corresponding to the user of the user terminal has been previously-stored in the database:
provide the webpage not including the web beacon to the user terminal, via the network; and distribute the advertisement content to the user terminal based on user information corresponding to the first user identification information previously-stored in the database, wherein the information provision apparatus estimates one or more demographic attributes of the user based on one or more attributes of at least one of: a previous webpage that the user has previously-accessed, and another webpage that is linked to the previous webpage, and stores the estimated one or more demographic attributes as user information associated with the first user identification information of the user.

2. The webpage request handling apparatus according to claim 1, wherein
the memory further stores freshness information associated with the user information, the freshness information indicating a freshness of the user information, and
the processor is further programmed to:
upon the determination that the first user identification information has been previously-stored in the database of the memory:
determine whether the freshness information corresponding to the user information of the user having the first user identification information is equal to or greater than a predetermined freshness threshold value; and
upon a determination that the freshness information is less than the predetermined freshness threshold value, request the information provision apparatus to transmit the user information corresponding to the second user identification information to the webpage request handling apparatus.

3. The webpage request handling apparatus according to claim 1, wherein
the stored user information includes a plurality of user attributes, and
the processor is further programmed to:
determine whether a number of user attributes stored in the database associated with the user are equal to or greater than a predetermined value; and
upon a determination that the number of user attributes are not equal to or greater than the predetermined value, request the information provision apparatus to transmit the user information corresponding to the second user identification information of the user to the webpage request handling apparatus.

4. The webpage request handling apparatus according to claim 2, wherein
the stored user information includes a plurality of user attributes, and
the processor is further programmed to:
determine whether a number of the plurality of user attributes stored in the database associated with the user are equal to or greater than a predetermined value; and
upon a determination that the number of the plurality of user attributes associated with the user are not equal to or greater than the predetermined value, request the information provision apparatus to transmit the user information corresponding to the second user identification information of the user to the webpage request handling apparatus.

5. The webpage request handling apparatus according to claim 4, wherein
the stored freshness information includes freshness information for each user attribute, and
the processor is further programmed to:
determine whether a number of the stored user attributes associated with the user that have the freshness information that is equal to or greater than the freshness threshold value is equal to or greater than a predetermined value; and
upon a determination that the number of the stored user attributes associated with the user that have the freshness information that is equal to or greater than the freshness threshold value is not equal to or greater than the predetermined value, request the information provision apparatus to transmit the user information corresponding to the second user identification information of the user to the webpage request handling apparatus.

6. The webpage request handling apparatus according to claim 3, wherein the processor is further programmed to request the information provision apparatus to transmit user attributes other than those stored in the database.

7. The webpage request handling apparatus according to claim 4, wherein the processor is further programmed to request the information provision apparatus to transmit user attributes other than those stored in the database.

8. The webpage request handling apparatus according to claim 5, wherein the processor is further programmed to request the information provision apparatus to transmit user attributes other than those stored in the database.

9. The webpage request handling apparatus according to claim 1, wherein the processor is further programmed to:
count a number of times user information corresponding to the second user identification information of the user has been previously-acquired from the information provision apparatus, and
upon a determination that the counted number of times that the user information corresponding to the second user identification information of the user has been previously-acquired from the information provision apparatus is less than a predetermined acquisition number threshold value, request the information provision apparatus to transmit the user information corresponding to the second user identification information of the user to the webpage request handling apparatus.

10. The webpage request handling apparatus according to claim 1, wherein the processor is further programmed to:
extract advertisement content candidates based on the user information of the user stored in the database; and
determine advertisement content that matches the estimated one or more attributes from among the advertisement content candidates.

11. The webpage request handling apparatus according to claim 10, wherein the processor is further programmed to:
determine whether a number of advertisement content candidates extracted is equal to or greater than a number of advertisement contents which are determined to be distributed to the user terminal; and
upon a determination that the number of the extracted advertisement content candidates is less than the number of advertisement contents which are determined to be distributed to the user terminal, request the information provision apparatus to transmit the user information corresponding to the second user identification information of the user to the webpage request handling apparatus.

12. A webpage request handling method comprising:
storing, by a processor in a memory, a database of user information associated with first user identification information of users who have previously accessed the webpage request handling apparatus;

when the processor receives, over a network, a request for a webpage from a user terminal:
  determining, by the processor, whether first user identification information corresponding to a user of the user terminal has been previously-stored in the database,
  upon a determination that the first user identification information corresponding to the user of the user terminal has not been previously-stored in the memory:
    providing, by the processor via the network, a webpage including a web beacon to the user terminal, the web beacon causing the user terminal to: access an information provision apparatus, and to notify the information provision apparatus of whether the user terminal has an information provision apparatus-generated cookie, the information provision apparatus-generated cookie including second user identification information that: (i) is different than the first user identification information, and (ii) identifies the user of the user terminal, the information provision apparatus generating the cookie including the second user identification information, when the user first accesses the information provision apparatus;
    receiving, by the processor from the information provision apparatus via the network, user information corresponding to the second user identification information; and
    distributing, by the processor via the network, advertisement content to the user terminal based on the received user information corresponding to the second user identification information acquired from the information provision apparatus; and
  upon a determination that the first user identification information corresponding to the user of the user terminal has been previously-stored in the database:
    providing, via the network by the processor, the webpage not including the web beacon; and
    distributing, by the processor via the network to the user terminal, advertisement content based on user information corresponding to the first user identification information previously-stored in the database, wherein the information provision apparatus estimates one or more demographic attributes of the user based on one or more attributes of at least one of: a previous webpage that the user has previously-accessed, and another webpage that is linked to the previous webpage, and stores the estimated one or more demographic attributes as user information associated with the first user identification information of the user.

13. A non-transitory computer-readable storage medium storing an executable program that, when executed by a computer, causes the computer to: when the computer receives, over a network, a request for a webpage from a user terminal:
  determine whether first user identification information corresponding to a user of the user terminal has been previously-stored in the database;
  upon a determination that the first user identification information corresponding to the user of the user terminal has not been previously-stored in the database:
    provide a webpage including a web beacon to the user terminal, via the network, the web beacon causing the user terminal to: access an information provision apparatus, and to notify the information provision apparatus of whether the user terminal has an information provision apparatus-generated cookie, the information provision apparatus-generated cookie including second user identification information that: (i) is different than the first user identification information, and (ii) identifies the user of the user terminal, the information provision apparatus generating the cookie including the second user identification information, when the user first accesses the information provision apparatus;
    receive, from the information provision apparatus, user information corresponding to the second user identification information; and
    distribute advertisement content to the user terminal based on the received user information corresponding to the second user identification information acquired from the information provision apparatus; and
  upon a determination that the first user identification information corresponding to the user of the user terminal has been previously-stored in the database:
    provide the webpage not including the web beacon to the user terminal, via the network; and
    distribute the advertisement content to the user terminal based on user information corresponding to the first user identification information previously-stored in the database, wherein the information provision apparatus estimates one or more demographic attributes of the user based on one or more attributes of at least one of: a previous webpage that the user has previously-accessed, and another webpage that is linked to the previous webpage, and stores the estimated one or more demographic attributes as user information associated with the first user identification information of the user.

* * * * *